(12) United States Patent
Takekoshi et al.

(10) Patent No.: US 7,256,241 B2
(45) Date of Patent: *Aug. 14, 2007

(54) METHODS FOR POLYMERIZING MACROCYCLIC POLYESTER OLIGOMERS USING CATALYST PROMOTERS

(75) Inventors: Tohru Takekoshi, Scotia, NY (US); Peter D. Phelps, Williamstown, MA (US); Yi-Feng Wang, Clifton Park, NY (US); Steven J. Winckler, Troy, NY (US)

(73) Assignee: Cyclics Corporation, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/329,454

(22) Filed: Jan. 10, 2006

(65) Prior Publication Data

US 2006/0115666 A1 Jun. 1, 2006

Related U.S. Application Data

(60) Continuation-in-part of application No. 10/408,753, filed on Apr. 7, 2003, now Pat. No. 6,994,914, which is a continuation of application No. 10/195,853, filed on Jul. 15, 2002, now Pat. No. 6,639,009, which is a continuation of application No. 09/754,943, filed on Jan. 4, 2001, now Pat. No. 6,420,047, which is a continuation-in-part of application No. 09/535,132, filed on Mar. 24, 2000, now Pat. No. 6,369,157, application No. 11/329,454, which is a continuation-in-part of application No. 11/091,721, filed on Mar. 28, 2005, now Pat. No. 7,186,666, which is a division of application No. 10/102,162, filed on Mar. 20, 2002, now Pat. No. 6,906,147.

(60) Provisional application No. 60/177,727, filed on Jan. 21, 2000.

(51) Int. Cl.
*C08F 275/00* (2006.01)
*C08G 63/85* (2006.01)
*C08G 63/78* (2006.01)

(52) U.S. Cl. .......... 525/274; 525/437; 525/438; 524/399; 528/274; 528/275; 528/485; 528/503; 502/159

(58) Field of Classification Search ........ 525/274, 525/437, 438; 524/399; 528/274, 275, 485, 528/503; 502/159

See application file for complete search history.

(56) References Cited

U.S. PATENT DOCUMENTS 2,628,171 A 2/1953 Green (Continued)

FOREIGN PATENT DOCUMENTS

BE 676324 6/1966

(Continued)

OTHER PUBLICATIONS

U.S. Appl. No. 09/974,722, filed Oct. 9, 2001, Phelps et al.

(Continued)

*Primary Examiner*—Duc Truong
(74) *Attorney, Agent, or Firm*—Goodwin Procter LLP

(57) ABSTRACT

The invention provides methods and formulations involving the use of promoters that accelerate the polymerization of macrocyclic polyester oligomers (MPOs). For example, in certain embodiments, the invention provides blends of macrocyclic polyester oligomer (MPO), catalyst, and promoter that are substantially stable at ambient temperature for a period of time. The blend material may be stored without premature polymerization of MPO or deactivation of catalyst. The invention also provides processes employing one-part, ready-to-polymerize blends that contain MPO, catalyst, and promoter, as well as processes in which the catalyst and promoter are used in separate streams and are contacted when it is desired to accelerate polymerization of MPO. Methods of the invention offer advantages in the manufacture of thermoplastic parts and composites, due at least in part to the unique properties of MPO.

39 Claims, 6 Drawing Sheets

U.S. PATENT DOCUMENTS

| | | | |
|---|---|---|---|
| 3,018,272 A | 1/1962 | Griffing et al. |
| 3,090,753 A | 5/1963 | Matuszak et al. |
| 3,786,067 A | 1/1974 | Throckmorton et al. |
| 3,859,246 A | 1/1975 | Jackson et al. |
| 3,964,923 A | 6/1976 | Zetmeir |
| 3,979,354 A | 9/1976 | Dyckman et al. |
| 4,012,460 A | 3/1977 | Takahashi |
| 4,063,009 A | 12/1977 | Ziegler et al. |
| 4,075,319 A | 2/1978 | Dyckman et al. |
| 4,082,709 A | 4/1978 | Dyckman et al. |
| 4,101,600 A | 7/1978 | Zhukov et al. |
| 4,115,468 A | 9/1978 | Antonov et al. |
| 4,118,432 A | 10/1978 | Kabanov et al. |
| 4,129,548 A | 12/1978 | McDonnell |
| 4,140,669 A | 2/1979 | Phipps, Jr. et al. |
| 4,165,305 A | 8/1979 | Sundie et al. |
| 4,187,197 A | 2/1980 | Kabanov et al. |
| 4,230,824 A | 10/1980 | Nodelman |
| 4,232,087 A | 11/1980 | Trask |
| 4,233,232 A | 11/1980 | Howarth |
| 4,235,825 A | 11/1980 | Milam |
| 4,341,842 A | 7/1982 | Lampe |
| 4,377,684 A | 3/1983 | Bolon et al. |
| 4,409,266 A | 10/1983 | Wieczorrek et al. |
| 4,461,854 A | 7/1984 | Smith |
| 4,478,963 A | 10/1984 | McGarry |
| 4,518,283 A | 5/1985 | Gebauer et al. |
| 4,520,123 A | 5/1985 | Hall |
| 4,525,565 A | 6/1985 | Laisney et al. |
| 4,535,102 A | 8/1985 | Kusumoto et al. |
| 4,547,531 A | 10/1985 | Waknine |
| 4,559,262 A | 12/1985 | Cogswell et al. |
| 4,568,703 A | 2/1986 | Ashida |
| 4,584,254 A | 4/1986 | Nakayama et al. |
| 4,590,259 A | 5/1986 | Kosky et al. |
| 4,591,624 A | 5/1986 | Hall |
| 4,605,731 A | 8/1986 | Evans et al. |
| 4,616,077 A | 10/1986 | Silva |
| 4,638,077 A | 1/1987 | Brunelle et al. |
| 4,644,053 A | 2/1987 | Brunelle et al. |
| 4,647,633 A | 3/1987 | Kostelnik |
| 4,672,003 A | 6/1987 | Letoffe |
| 4,680,345 A | 7/1987 | Kobayashi et al. |
| 4,725,666 A | 2/1988 | Curatolo et al. |
| 4,727,134 A | 2/1988 | Brunelle et al. |
| 4,740,583 A | 4/1988 | Brunelle et al. |
| 4,757,132 A | 7/1988 | Brunelle et al. |
| 4,785,060 A | 11/1988 | Nagler |
| 4,803,288 A | 2/1989 | Kitamura et al. |
| 4,812,524 A | 3/1989 | Baghdachi |
| 4,816,548 A | 3/1989 | Evans et al. |
| 4,824,595 A | 4/1989 | Richter et al. |
| 4,829,144 A | 5/1989 | Brunelle et al. |
| 4,831,001 A | 5/1989 | Evans et al. |
| 4,845,178 A | 7/1989 | Hostetler et al. |
| 4,852,591 A | 8/1989 | Wisotzki et al. |
| 4,880,848 A | 11/1989 | Ghali |
| 4,888,411 A | 12/1989 | Shannon et al. |
| 4,889,885 A | 12/1989 | Usuki et al. |
| 4,900,706 A | 2/1990 | Sasaki et al. |
| 4,904,810 A | 2/1990 | Brunelle et al. |
| 4,909,846 A | 3/1990 | Barfurth et al. |
| 4,927,728 A | 5/1990 | Isoda et al. |
| 4,942,198 A | 7/1990 | Dickerhof et al. |
| 4,960,915 A | 10/1990 | Thiele et al. |
| 4,980,453 A | 12/1990 | Brunelle et al. |
| 4,992,228 A | 2/1991 | Heck et al. |
| 4,994,541 A | 2/1991 | Dell et al. |
| 4,999,420 A | 3/1991 | Leitz et al. |
| 5,006,637 A | 4/1991 | Guggenheim et al. |
| 5,019,450 A | 5/1991 | Cogswell et al. |
| 5,023,346 A | 6/1991 | Schon et al. |
| 5,039,717 A | 8/1991 | Kawakami et al. |
| 5,039,783 A | 8/1991 | Brunelle et al. |
| 5,051,482 A | 9/1991 | Tepic |
| 5,071,711 A | 12/1991 | Heck et al. |
| 5,095,088 A | 3/1992 | Wang |
| 5,097,008 A | 3/1992 | Krabbenhoft et al. |
| 5,116,900 A | 5/1992 | Flautt et al. |
| 5,124,427 A | 6/1992 | Potter et al. |
| 5,159,024 A | 10/1992 | Brindöpke et al. |
| 5,175,228 A | 12/1992 | Wang et al. |
| 5,191,013 A | 3/1993 | Cook et al. |
| 5,191,038 A | 3/1993 | Krabbenhoft et al. |
| 5,196,055 A | 3/1993 | Lesney et al. |
| 5,202,386 A | 4/1993 | Hogt et al. |
| 5,207,850 A | 5/1993 | Parekh |
| 5,214,158 A | 5/1993 | Brunelle et al. |
| 5,225,129 A | 7/1993 | van den Berg |
| 5,231,161 A | 7/1993 | Brunelle et al. |
| 5,235,018 A | 8/1993 | Potter et al. |
| 5,237,042 A | 8/1993 | Kim et al. |
| 5,241,880 A | 9/1993 | Mizobata et al. |
| RE34,431 E | 11/1993 | Brunelle et al. |
| 5,260,376 A | 11/1993 | Nakahata et al. |
| 5,264,548 A | 11/1993 | Brunelle et al. |
| 5,281,669 A | 1/1994 | Kambour et al. |
| 5,288,837 A | 2/1994 | Munjal et al. |
| 5,300,392 A | 4/1994 | Odell et al. |
| 5,300,393 A | 4/1994 | Odell et al. |
| 5,300,590 A | 4/1994 | Cook et al. |
| 5,302,484 A | 4/1994 | Odell et al. |
| 5,314,779 A | 5/1994 | Odell et al. |
| 5,321,117 A | 6/1994 | Brunelle |
| 5,340,909 A | 8/1994 | Doerr et al. |
| 5,348,985 A | 9/1994 | Pearce et al. |
| 5,349,040 A | 9/1994 | Trinks et al. |
| 5,350,726 A | 9/1994 | Shaffer |
| 5,350,819 A | 9/1994 | Shaffer |
| 5,356,984 A | 10/1994 | Carbone et al. |
| 5,386,037 A | 1/1995 | Takekoshi et al. |
| 5,387,666 A | 2/1995 | Takekoshi et al. |
| 5,389,719 A | 2/1995 | Takekoshi et al. |
| 5,407,984 A | 4/1995 | Brunelle et al. |
| 5,408,001 A | 4/1995 | Nakahata et al. |
| 5,410,014 A | 4/1995 | Haese et al. |
| 5,418,303 A | 5/1995 | Shaffer |
| 5,420,226 A | 5/1995 | Hamer et al. |
| 5,426,156 A | 6/1995 | Bederke et al. |
| 5,434,244 A | 7/1995 | Warner et al. |
| 5,439,996 A | 8/1995 | Baird et al. |
| 5,444,146 A | 8/1995 | Potter et al. |
| 5,446,122 A | 8/1995 | Warner et al. |
| 5,448,001 A | 9/1995 | Baird |
| 5,466,744 A | 11/1995 | Evans et al. |
| 5,498,651 A | 3/1996 | Brunelle |
| 5,506,316 A | 4/1996 | Shaffer |
| 5,506,328 A | 4/1996 | Chandalia et al. |
| 5,508,343 A | 4/1996 | Holley |
| 5,516,879 A | 5/1996 | Yuo et al. |
| 5,519,108 A | 5/1996 | Yuo et al. |
| 5,525,673 A | 6/1996 | Nakahata et al. |
| 5,527,976 A | 6/1996 | Takekoshi et al. |
| 5,530,052 A | 6/1996 | Takekoshi et al. |
| 5,591,800 A | 1/1997 | Takekoshi et al. |
| 5,605,979 A | 2/1997 | Priddy, Jr. et al. |
| 5,610,260 A | 3/1997 | Schmalstieg et al. |
| 5,637,655 A | 6/1997 | Priddy, Jr. et al. |
| 5,646,306 A | 7/1997 | Elsasser, Jr. |
| 5,648,454 A | 7/1997 | Brunelle |
| 5,654,395 A | 8/1997 | Jackson et al. |
| 5,656,712 A | 8/1997 | Mirossay |
| 5,661,214 A | 8/1997 | Brunelle et al. |
| 5,663,282 A | 9/1997 | Todt et al. |

| | | | |
|---|---|---|---|
| 5,668,186 A | 9/1997 | Brunelle et al. | |
| 5,693,722 A | 12/1997 | Priddy, Jr. et al. | |
| 5,700,888 A | 12/1997 | Hall | |
| 5,703,183 A | 12/1997 | Shaffer | |
| 5,707,439 A | 1/1998 | Takekoshi et al. | |
| 5,710,086 A | 1/1998 | Brunelle et al. | |
| 5,736,621 A | 4/1998 | Simon et al. | |
| 5,756,644 A | 5/1998 | Hodge et al. | |
| 5,760,161 A | 6/1998 | Goins, Jr. et al. | |
| 5,786,440 A | 7/1998 | Kohler et al. | |
| 5,795,423 A | 8/1998 | Johnson | |
| 5,830,541 A | 11/1998 | Carswell et al. | |
| 5,849,255 A | 12/1998 | Sawyer et al. | |
| 5,849,830 A | 12/1998 | Tsipursky et al. | |
| 5,869,586 A | 2/1999 | Riedel et al. | |
| 5,936,029 A | 8/1999 | Hall | |
| 5,947,392 A | 9/1999 | Molnar et al. | |
| 5,952,455 A | 9/1999 | Yanagisawa et al. | |
| 5,965,686 A | 10/1999 | Blank et al. | |
| 5,968,642 A | 10/1999 | Saito | |
| 6,074,978 A | 6/2000 | Shaffer | |
| 6,078,135 A | 6/2000 | Lee et al. | |
| 6,080,834 A | 6/2000 | Putzig et al. | |
| 6,084,019 A | 7/2000 | Matayabas, Jr. et al. | |
| 6,093,765 A | 7/2000 | Cottis et al. | |
| 6,121,466 A | 9/2000 | Osterholt et al. | |
| 6,124,412 A | 9/2000 | Bin-Taleb et al. | |
| 6,127,436 A | 10/2000 | Chatterjee et al. | |
| 6,147,026 A | 11/2000 | Setiabudi et al. | |
| 6,162,857 A | 12/2000 | Trexler, Jr. et al. | |
| 6,171,995 B1 | 1/2001 | Mühlebach et al. | |
| 6,191,318 B1 | 2/2001 | Park et al. | |
| 6,211,316 B1 | 4/2001 | Seebach | |
| 6,271,317 B1 | 8/2001 | Halasa et al. | |
| 6,284,868 B1 | 9/2001 | Geprags et al. | |
| 6,297,330 B1 | 10/2001 | Burch, Jr. et al. | |
| 6,353,030 B1 | 3/2002 | Prikoszovich | |
| 6,369,157 B1 | 4/2002 | Winckler et al. | |
| 6,376,026 B1 | 4/2002 | Correll et al. | |
| 6,414,103 B1 | 7/2002 | Correll et al. | |
| 6,420,047 B2 | 7/2002 | Winckler et al. | |
| 6,420,048 B1 | 7/2002 | Wang | |
| 6,432,486 B1 | 8/2002 | Paris et al. | |
| 6,436,548 B1 | 8/2002 | Phelps | |
| 6,436,549 B1 | 8/2002 | Wang | |
| 6,458,972 B1 | 10/2002 | Surburg et al. | |
| 6,525,164 B2 | 2/2003 | Faler | |
| 6,586,558 B2 | 7/2003 | Schmidt et al. | |
| 6,639,009 B2 | 10/2003 | Winckler et al. | |
| 6,646,134 B2 | 11/2003 | Brugel | |
| 6,670,429 B2 | 12/2003 | Appelman et al. | |
| 6,713,601 B2 | 3/2004 | Phelps | |
| 6,787,632 B2 | 9/2004 | Phelps et al. | |
| 6,806,346 B2 | 10/2004 | Brugel | |
| 6,855,798 B2 | 2/2005 | Faler | |
| 6,906,147 B2 | 6/2005 | Wang et al. | |
| 6,960,626 B2 | 11/2005 | Takekoshi et al. | |
| 6,962,968 B2 | 11/2005 | Phelps et al. | |
| 6,994,914 B2 | 2/2006 | Winckler et al. | |
| 7,022,806 B2 | 4/2006 | Faler | |
| 7,071,291 B2 | 7/2006 | Thompson et al. | |
| 2002/0028904 A1 | 3/2002 | Dhawan et al. | |
| 2002/0137834 A1 | 9/2002 | Barbee et al. | |
| 2003/0130477 A1 | 7/2003 | Winckler et al. | |
| 2004/0155380 A1 | 8/2004 | Kendall et al. | |
| 2004/0188883 A1 | 9/2004 | Barron et al. | |
| 2005/0059768 A1 | 3/2005 | Dion et al. | |
| 2005/0288176 A1 | 12/2005 | Kuhlman | |
| 2005/0288420 A1 | 12/2005 | Paquette | |
| 2006/0003887 A1 | 1/2006 | Paquette | |
| 2006/0004135 A1 | 1/2006 | Paquette | |
| 2006/0025562 A1 | 2/2006 | Dion et al. | |

FOREIGN PATENT DOCUMENTS

| | | |
|---|---|---|
| CH | 654 304 A5 | 2/1986 |
| CN | 1120555 | 4/1996 |
| DE | 3607627 | 9/1987 |
| DE | 4034574 A1 | 5/1992 |
| EP | 0000544 B1 | 8/1982 |
| EP | 0153785 A2 | 9/1985 |
| EP | 0 172 636 | 2/1986 |
| EP | 0216496 A2 | 4/1987 |
| EP | 0 273 148 | 7/1988 |
| EP | 0153785 B1 | 7/1989 |
| EP | 0419254 A2 | 3/1991 |
| EP | 0486832 A2 | 5/1992 |
| EP | 0264835 B1 | 6/1992 |
| EP | 0 499 747 | 8/1992 |
| EP | 0235741 B1 | 1/1993 |
| EP | 0543492 A1 | 5/1993 |
| EP | 0566313 A2 | 10/1993 |
| EP | 0589640 A1 | 3/1994 |
| EP | 0598604 A1 | 5/1994 |
| EP | 0601753 A1 | 6/1994 |
| EP | 0635512 A1 | 1/1995 |
| EP | 0655476 A1 | 5/1995 |
| EP | 0436186 B1 | 10/1995 |
| EP | 0688778 A1 | 12/1995 |
| EP | 0714926 A2 | 6/1996 |
| EP | 0699701 A3 | 9/1996 |
| EP | 0 776 927 | 6/1997 |
| EP | 0798336 A2 | 10/1997 |
| EP | 1 008 629 | 6/2000 |
| EP | 1 026 203 | 8/2000 |
| EP | 1111012 A9 | 6/2001 |
| EP | 1 172 409 | 1/2002 |
| EP | 0 594 385 | 5/2003 |
| EP | 1 308 208 | 5/2003 |
| EP | 1 354 908 | 10/2003 |
| EP | 01968581.7-2102 | 11/2003 |
| EP | 1 378 540 | 1/2004 |
| EP | 01942649.3-2102 | 1/2004 |
| EP | 1 420 036 | 5/2004 |
| EP | 02756358.4-2117 | 5/2004 |
| EP | 1 475 402 | 11/2004 |
| EP | 03714278.3-2102 | 11/2004 |
| EP | 01968413.3-2102 | 12/2004 |
| EP | 02734665.9-2102 | 12/2004 |
| EP | 1 409 475 B1 | 10/2005 |
| FR | 2 530 628 | 1/1984 |
| GB | 765 597 | 1/1957 |
| GB | 798412 | 7/1958 |
| GB | 957841 | 5/1964 |
| GB | 991020 | 5/1965 |
| GB | 1044205 | 9/1966 |
| GB | 1108921 | 4/1968 |
| GB | 1273225 | 5/1972 |
| GB | 1349324 | 4/1974 |
| GB | 2 123 405 A | 2/1984 |
| JP | 4621873 | 6/1971 |
| JP | 476425 | 10/1972 |
| JP | 57-122078 A | 7/1982 |
| JP | 6275547 | 4/1987 |
| JP | 62141063 A | 6/1987 |
| JP | 63156824 A | 11/1988 |
| JP | 02 147657 A | 6/1990 |
| JP | 02298512 | 12/1990 |
| JP | 4253764 | 9/1992 |
| JP | 08-093594 | 4/1996 |
| JP | 09048876 | 2/1997 |
| JP | 09-110832 | 4/1997 |
| JP | 09-238806 | 9/1997 |
| JP | 10-069915 | 3/1998 |

| | | |
|---|---|---|
| JP | 10-194262 | 7/1998 |
| JP | 11-136942 | 5/1999 |
| JP | 2001031846 | 2/2001 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| JP | 2003 082 081 | 3/2003 |
| SU | 1077893 | 3/1984 |
| SU | 1532560 A1 | 12/1989 |
| WO | 88/06605 | 9/1988 |
| WO | 91/09899 | 7/1991 |
| WO | 93/04106 | 3/1993 |
| WO | 95/00574 | 1/1995 |
| WO | 95/30702 | 11/1995 |
| WO | 96/22319 | 7/1996 |
| WO | 99/25485 | 5/1999 |
| WO | 00/27632 | 5/2000 |
| WO | 00/38897 | 7/2000 |
| WO | 2001/053379 | 7/2001 |
| WO | 01/56694 A1 | 8/2001 |
| WO | 2002/018476 | 3/2002 |
| WO | 2002/022738 | 3/2002 |
| WO | 02/051616 A | 7/2002 |
| WO | 2002/098946 | 12/2002 |
| WO | 2002/098947 | 12/2002 |
| WO | 2003/002551 | 1/2003 |
| WO | 03/031496 A1 | 4/2003 |
| WO | 2003/031059 | 4/2003 |
| WO | 2003/080705 | 10/2003 |
| WO | 2004/058471 | 7/2004 |
| WO | 2004/058854 | 7/2004 |
| WO | 2004/058868 | 7/2004 |
| WO | 2004/058872 | 7/2004 |
| WO | 2004/060640 | 7/2004 |
| WO | 2005/063882 | 7/2005 |
| WO | 2005/090508 | 9/2005 |
| WO | 2005/105889 | 11/2005 |
| WO | 2005/121233 | 12/2005 |
| WO | 2006/009735 | 1/2006 |
| WO | 2006/009803 | 1/2006 |
| WO | 2006/009804 | 1/2006 |
| WO | 2006/028541 | 3/2006 |

OTHER PUBLICATIONS

U.S. Appl. No. 09/945,233, filed Aug. 31, 2001, Faler.
U.S. Appl. No. 09/906,385, filed Jul. 16, 2001, Wang.
U.S. Appl. No. 09/874,706, filed Jun. 5, 2001, Wang.
U.S. Appl. No. 09/754,943, filed Jan. 4, 2001, Winckler et al.
U.S. Appl. No. 09/659,975, filed Sep. 12, 2000, Phelps.
U.S. Appl. No. 10/102,162, filed Mar. 20, 2002, Wang et al.
U.S. Appl. No. 10/040,530, filed Jan. 7, 2002, Wang.
Ahjopalo, L. et al. (2000) "Cyclic Oligomers in Saturated Polyesters" Polymer, vol. 41, No. 23, 8283-8290.
Bagshaw et al., "Templating of Mesoporous Molecular Sieves by Nonionic Polyethylene Oxide Surfactants," Science, 269, p. 1242, Sep. 1, 1995.
Beach, A. Christopher G. "The Preparation of Mirrors by Sputtering Metals onto Glass Surfaces," A. Inst. P., Chelsea Polytechnic, M.S. received, Mar. 17, 1930.
Brunelle (1995) "Macrocycles For The Synthesis of High Molecular Weight Polymers" pp. 197-235, ch. 6, New Methods of Polymer Synthesis: vol. 2, edited by J.R. Ebdon and G.C. Eastmond.
Brunelle et al. (1997) "Semi-crystalline Polymers via Ring-Opening Polymerization: Preparation and Polymerization of Alkylene Phthalate Cyclic Oligomers" Polymers Preprints vol. 38, No. 2, pp. 381-382.
Brunelle et al. (1998) "Semicrystalline Polymers via Ring-Opening Polymerization: Preparation and Polymerization of Alkylene Phthalate Cyclic Oligomers" Macromolecules vol. 31, No. 15, 4782-4790.
Burch, R. R. et al. (2000) "Synthesis of Cyclic Oligoesters and Their Rapid Polymerization to High Molecular Weight" Macromolecules, vol. 33, No. 14, 5053-5064.
Chisholm et al. "Syntheses and structural characterization of 2,2'.-methylene-bis(6-$t$-butyl-4-methyl-phenoxide) complexes of titanium, zirconium and tantalum," Polyhedron, vol. 16, No. 17, (1997) pp. 2941-2949.
Cotton, N. J. et al. (1993) "Rate and Extent of Supercritical Fluid Extraction of Cyclic Trimer from Poly(Ethylene Terephthalate) at Elevated Temperatures" Journal of Chromatographic Science, vol. 31, No. 5, 157-161.
Cussler et al. "Barrier Membranes," Journal of Membrane Science, 38 (1988) pp. 161-174.
Deleuze et al. (1998) "Polymer-Supported Titanates as Catalysts for Transesterification Reactions" Polymer, vol. 39, No. 24, pp. 6109-6114.
Deleuze et al. (2000) "Synthesis of Porous Supports Containing $N$-($p$-hydroxyphenyl)- or $N$-(3-4-dihydroxybenzyl) Maleimide-Anchored Titanates and Application as Catalysts for Transesterification and Epoxidation Reactions" Journal of Polymer Science, vol. 38, pp. 2879-2886.
"DuPont™ Tyzor® Organic Titanates General Brochure" (2001) E.I. du Pont de Nemours and Company, 12 pages.
DuPont™ Zonyl® Fluorosurfactants Dupont The Miracles of Science "Chemicals to Enhance Your Product's Performance" http://www.dupont.com/zonyl/perform.html, last searched on May 16, 2002 and pp. 1-3 downloaded on May 16, 2002.
Durfee et al. "Chemical and Electrochemical Reduction of Titanium (IV) Aryloxides," Inorganic Chemistry, 24 (1985) pp. 4569-4573.
Fantacci et al. "Density Functional Study of Tetraphenolate and Calix[4]arene Complexes of Early Transition Metals," Inorganic Chemistry, 40 (2001) pp. 1544-1549.
Fukushima et al. "Graphite Nanoplatelets as Reinforcements for Polymers: Structural, Electrical and Thermal Properties," Proc. 2nd Ann., Automotive Comp. Conf., Soc. Plast. Eng., Sep. 2002, 7 pgs.
Fukushima et al. "Synthesis of an Intercalated Compound of Montmorillonite and 6-Polyamide," Journal of Inclusion Phenomena, 5 (1987) pp. 473-482.
Hall et al. "Recent research on the synthesis and applications of cyclic oligomers," Reactive & Functional Polymers, 41 (1999), pp. 133-139.
Hamb et al. "Synthesis of Cyclic Tris(Ethylene Terephthalate), " Polymer Letters, 5 (1967), pp. 1057-1058.
Hamilton et al. (1998) "Cyclic Polyesters: Part 8. Preparation and Characterization of Cyclic Oligomers in Six Aromatic Ester and Ether-Ester Systems" Polymer vol. 39, No. 14., 3241-3252.
Harrison, A. G. et al. (1997) "Analysis of cyclic oligomers of poly(ethylene terephthalate) by liquid chromatography/mass spectrometry" Polymer Communications, vol. 38, No. 10, 2549-2555.
Henshaw et al. (1994) "Recycling of a Cyclic Thermoplastic Composite Material by Injection and Compression Molding" J. of Thermoplastic Composite Materials vol. 7 (1), 14-29.
Hubbard, P. A. (1996) "Polyesters via Macrocyclic Oligomers" Dissertation presented at the University of Akron.
Kaviratna et al., "Synthesis of Polyether-Clay Nanocomposites: Kinetics of Epoxide Self-Polymerization in Acidic Smectite Clays," Polym. Prep., 31(1), 788 (1994).
Kojima et al., "Mechanical properties of nylon 6-clay hybrid," J. Mater. Res., 8, 1185 (1993).
Kricheldorf, H. R. et al. (1997) "Macrocycles IV. Macrocyclic Polylactones as Bifunctional Monomers for Polycondensations" Journal of Polymer Science, vol. 36, No. 9, 1373-1378.
Kricheldorf, H. R. et al. (1998) "Macrocycles. 3. Telechelic Polylactones via Macrocyclic Polymerization" Macromolecules, vol. 31, No. 3, 614-620.
Lancaster Results, Titanium (IV), http://www.lancastersynthesis.com/home_quick_search.htm; pp. 1-3 downloaded on Nov. 29, 2001; last searched on Apr. 22, 2002 and pp. 4-8 downloaded on Apr. 22, 2002.
Lattimer et al. (1998) "MALDI-MS Analysis of Pyrolysis Products From a Segmented Polyurethane" Journal of Analytical and Applied Pyrolysis, vol. 48, 1-15.

Lee, J. et al., "Fire Retardent Polyetherimide Nanocomposites," Matter Res. Soc. Proc., 457, 513-518, (1997).

Lee, S.-S. et al., "Synthesis of PET-Layered Silicate Nanocomposites Using Cyclic Ester Oligomers," Polymeric Materials: Science and Engineering, 89, 370-1 (2003).

Lewis et al. (1999) "A Highly Efficient Preparation of Methacrylate Esters using Novel Solid Phase Titanium-Based Transesterification Catalysts" Synlett, pp. 957-959.

Lui et al. (1999) "Preparation of Cyclic Polyester Oligomers and Ultra-Low VOC Polyester Coatings" Polymer Reprints, vol. 40, No. 1, pp. 137-138.

Martin et al. (1987) "Pultrusion", Engineered Materials Handbook; vol. 1 Composites, pp. 533-543.

Messersmith et al., "Polymer-Layered Silicate Nanocomposites: In Situ Intercalative Polymerization of $\epsilon$-Caprolactone in Layered Silicates," Chem. Mater., 5, 1064 (1993).

Miller, S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" Makromol. Chem., vol. 184, No. 12, 2487-95.

Mueller, F. J. et al. (1983) "Synthesis of Cyclic Oligomers of Butylene Terephthalate" Makromol. Chem., vol. 184, No. 12, 2487-95. (Translation).

Nazar, et al., "Synthesis and Properties of a New (PEO)x[Na(H2O)]0.25MoO3 Nanocomposites," J. Mater. Res., 5(11), 1985 (1995).

Okada, et al., "Synthesis and Characterization of a Nylon 6-Clay Hybrid," Polym. Prep., 28, 447, (1987).

Okuda et al. "Synthesis and Characterization of Mononuclear Titanium Complexes Containing a Bis(phenoxy) Ligand Derived from 2,2'-Methylene-bis(6-tert-butyl-4-methylphenol)," Chem. Ber., vol. 128, (1995) pp. 221-227.

Oriakhi et al., "Poly(Pyrrole) and Poly(Thiophene) / Clay Nanocomposites Via Latex-Colloid Interaction," Mater. Res. Bull., 30, No. 6, p. 723, (1995).

Perovic et al. (1982) "Crystallization of Cyclic Oligomers in Commercial Poly(ethleneterephthalate) Films" Polymer Bulletin vol. 6, 277-283.

Perovic, A. (1985) "Morphological Instability of poly(ethylene terephthalate) cyclic oligomer crystals"Journal of Material Science, vol. 20, Iss. 4, 1370-1374.

Product Detail and structure Image, Titanium (IV) butoxide, polymer, http://www.sigmaaldrich.com/cgi-in/hsrun/Distributed/HahtShop/HahtShop.htx:start=HS_FramesetMain; last searched on Mar. 27, 2002 and pp. 1-2 downloaded on Mar. 27, 2002.

Roelens, S. (1988) "Organotin-Mediated Synthesis of Macrocyclic Polyesters: Mechanism and Selectivity in the Reaction of Dioxastannolanes with Diacyl Dichlorides" Journal of the Chemical Society, Perkin Transactions 2, vol. 8, 1617-1625.

Ruddick et al. "A new method for the polymer-supported synthesis of cyclic oligoesters for potential applications in macrocyclic lactone synthesis and combinatorial chemistry," J. Chem. Soc., Perkin Trans. 1, 2002, pp. 627-637.

Scatteia et al., "Rheology of PBT-Layered Silicate Nanocomposites Prepared by Melt Compounding," Plastics, Rubbers and Composites, 33, 85-91 (2004) and references therein.

Spanagel et al. "Macrocyclic Esters," Contribution No. 153 from The Experimental Station of E.I. duPont deNemours &Company, vol. 57, pp. 929-934.

Toth et al. "Towards supported catalyst models: the synthesis, characterization, redox chemistry, and structures of the complexes Ti(Oar')$_4$ (Ar'=C$_6$H$_4$(2-t-Bu), C$_6$H(2,3,5,6-Me)$_4$)," Canadian Journal of Chemistry, vol. 69, (1991) pp. 172-178.

Tripathy, et al., "Poly(Butylene Terephthalate) Nanocomposites Prepared by In-Situ Polymerization," Macromolecules, 36, 8593-5 (2003).

Uhi et al. "Flame Retarduncy of Graphite Nanocomposites," Polym. Mater. Sci. Eng. 83:56(2000).

Usuki et al. "Swelling behavior of montmorillonite cation exchanged for $\omega$-amino acids by $\epsilon$-caprolactam," J. Mater. Res., vol. 8, No. 5, May 1993, pp. 1174-1178.

Usuki et al. "Synthesis of nylon 6-clay hybrid," J. Mater. Res., vol. 8, No. 5, May 1993, pp. 1179-1184.

Vankelecom et al. "Incorporation of Zeolites in polyimide Membranes," J. Phys. Chem., 99, 13187 (1995).

Ward et al. "Gas barrier improvement using vermiculite and mica in polymer films," Journal of Membrane Science, 55 (1991) pp. 173-180.

Xiao et al. "Preparaton of exfoliated graphite/polystyrene composite by polymerization-filling technique," Polymer, 42 (2001) pp. 4813-4816.

Yano, K. et al., "Synthesis and Properties of Polyimide-Clay Hybrid," J. Polym. Sci., Part A, Polym. Chem., 31, 2493 (1993).

Youk et al. "Polymerization of Ethylene Terephthalate Cyclic Oligomers with Antimony Trioxide," Macromolecules, 33 (2000), pp. 3594-3599.

EPO Online Patent Register and Public File Inspection, European patent application No. EP20030714278.

Pre-examination Amendment filed Oct. 8, 2004, European patent application No. EP20030714278.

First Examination Report (with Annex) issued Nov. 25, 2004, European patent application No. EP20030714278.

Reply to First Examination Report filed Mar. 24, 2005, European patent application No. EP20030714278.

Second Examination Report (with Annex) issued Apr. 6, 2005, European patent application No. EP20030714278.

Reply to Second Examination Report filed Jul. 27, 2005, European patent application No. EP20030714278.

Further Reply to Second Examination Report filed Aug. 10, 2005, European patent application No. EP20030714278.

Third Examination Report (with Annex) issued Aug. 18, 2005, European patent application No. EP20030714278.

Reply to Third Examination Report filed Dec. 9, 2005, European patent application No. EP20030714278.

Four Examination Report (with Annex) issued Mar. 2, 2006, related European patent application No. EP20030714278.

Written Opinion of related International Application No. PCT/US2004/042666, dated May 23, 2005.

Kizilcan et al., "Block Copolymers of Styrene Containing Oligomeric Ester of Terephthalic Acids," Journal of Applied Polymer Science, vol. 76, pp. 648-653 (2000).

Database WPI Section Ch, Week 199029, Derwent Publications Ltd., London, GB; Class A23, AN 1990-219860, XP002343080, Jun. 6, 1990.

Database WPI Section Ch, Week 199114, Derwent Publications Ltd., London, GB; Class A23, AN 1991-097785, XP002390855, Feb. 21, 1991.

Database WPI Section Ch, Week 199954, Derwent Publications Ltd., London, GB; Class A23, AN 1999-622614, XP002390856, May 18, 1999.

Jiminez, G., et al., "Structure and thermal/mechanical properties of poly($\epsilon$-caprolactone)-clay blend," Journal of Applied Polymer Science (XP000916366 ISSN: 0021-8995), John Wiley and Sons, Inc., NY, vol. 64, No. 11, 1997, pp. 2211-2220.

Krikorian, V., et al., "Unusual crystallization behavior of organoclay reinforced poly(l-lactic acid) nanocomposites," Macromolecules (XP001200895 ISSN: 0024-9297), ACS, Washington, D.C., vol. 37, No. 17, Aug. 24, 2004, pp. 6480-6491.

Messersmith et al., "Sytnthesis and barrier properties of poly($\epsilon$-caprolactone)-layered silicate nanocomposites," Journal of Polymer Science: Part A: Polymer Chemistry (XP002343042) vol. 33, 1995, pp. 1047-1057.

PCT International Search Report and Written Opinion of the International Searching Authority, International application No. PCT/US2005/019494, issued Sep. 13, 2005.

PCT International Search Report and Written Opinion of the International Searching Authority, International application No. PCT/US2006/007672, issued Jul. 27, 2006.

PCT International Search Report and Written Opinion of the International Searching Authority, International application No. PCT/US2006/010541, issued Sep. 1, 2006.

"Rompp-Chemielexikon," 1992, Thieme 6, XP002343043.

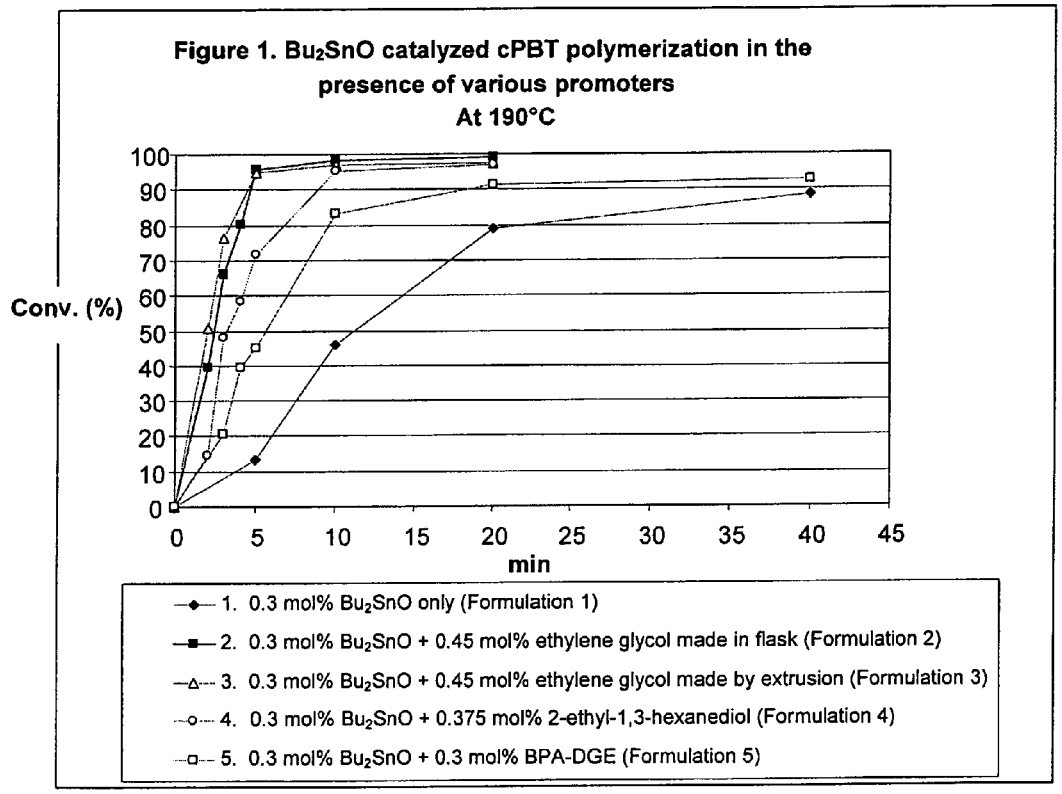

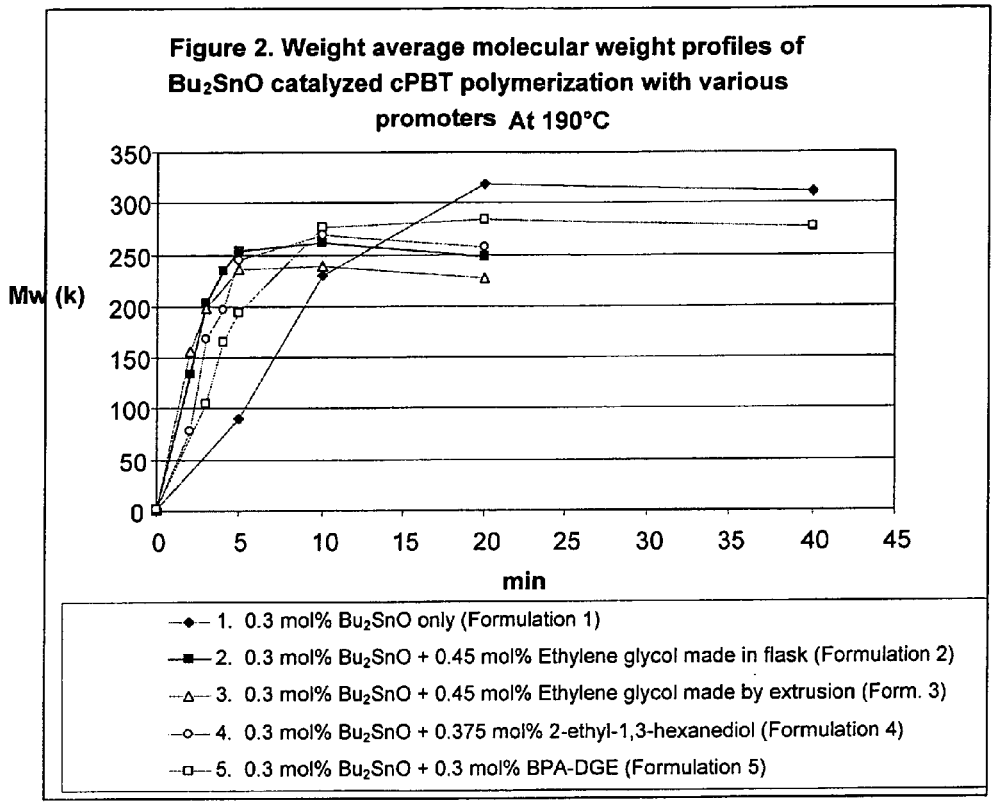

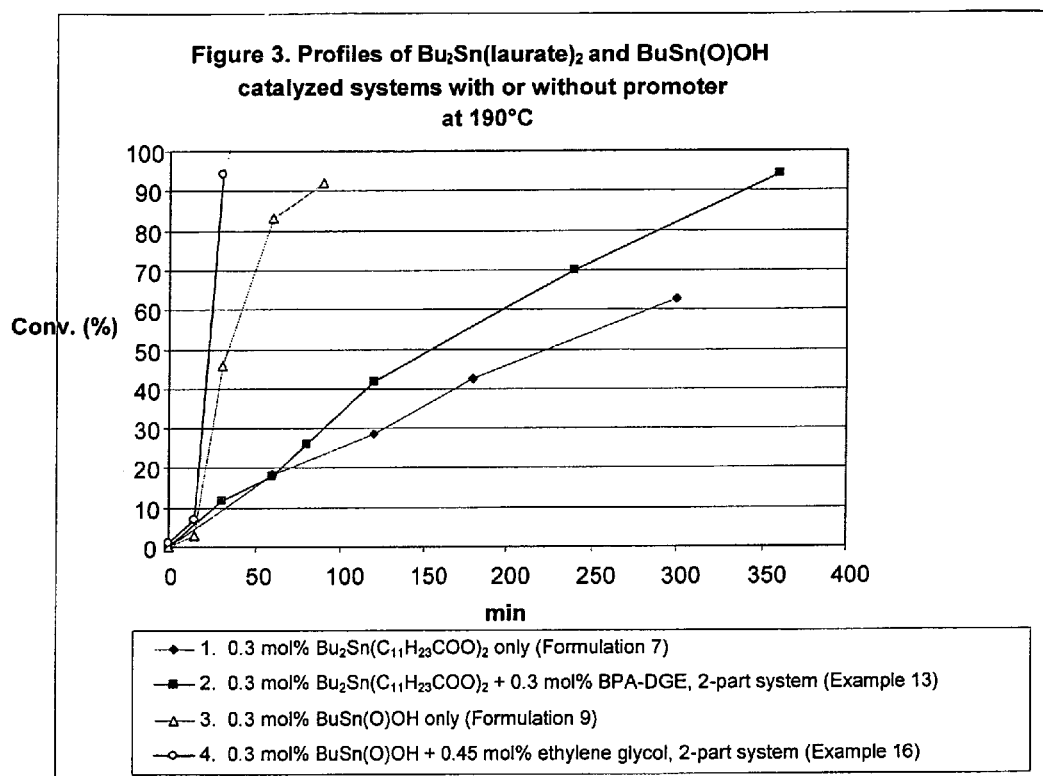

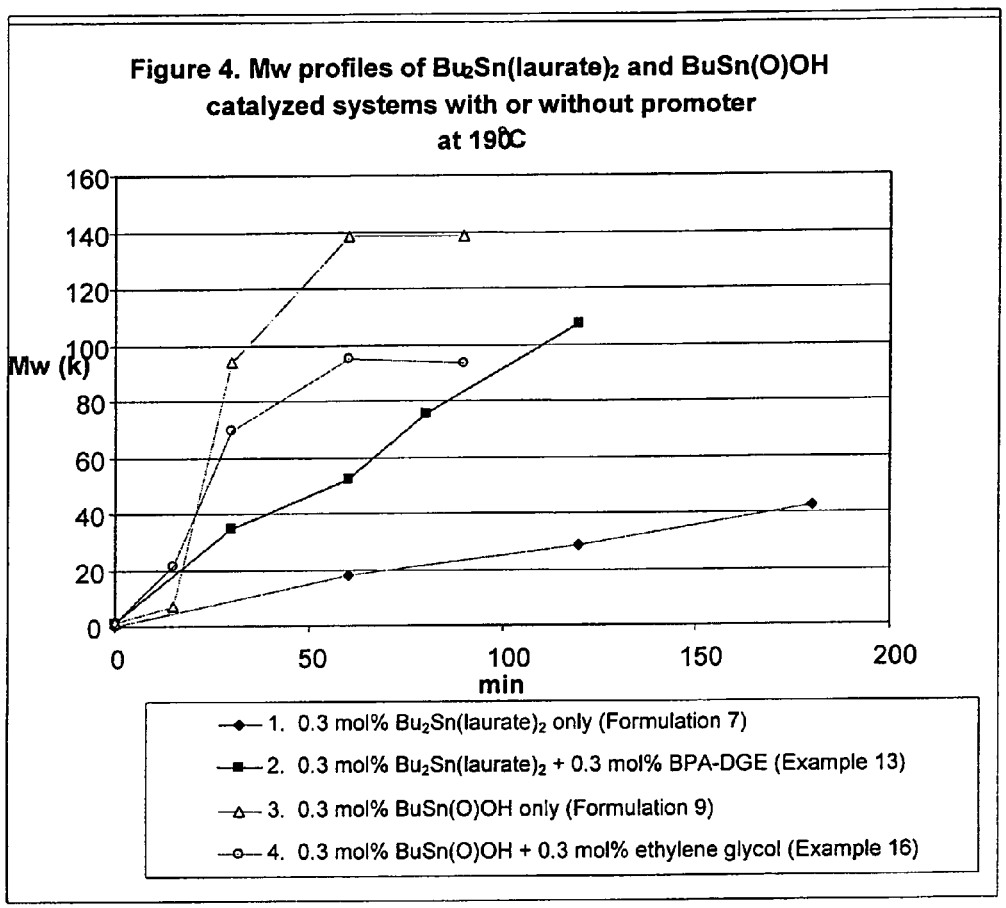

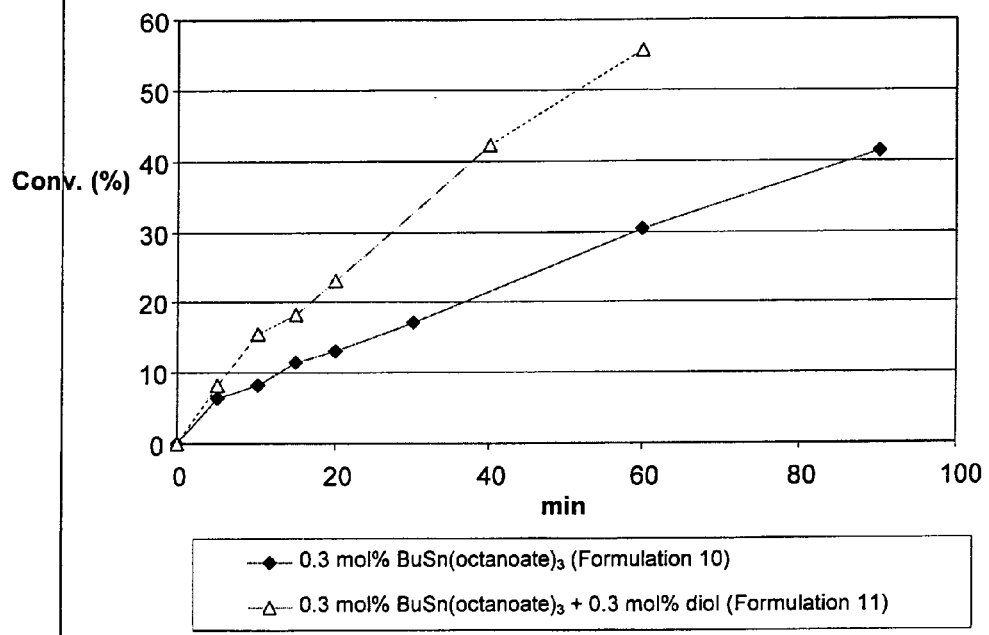

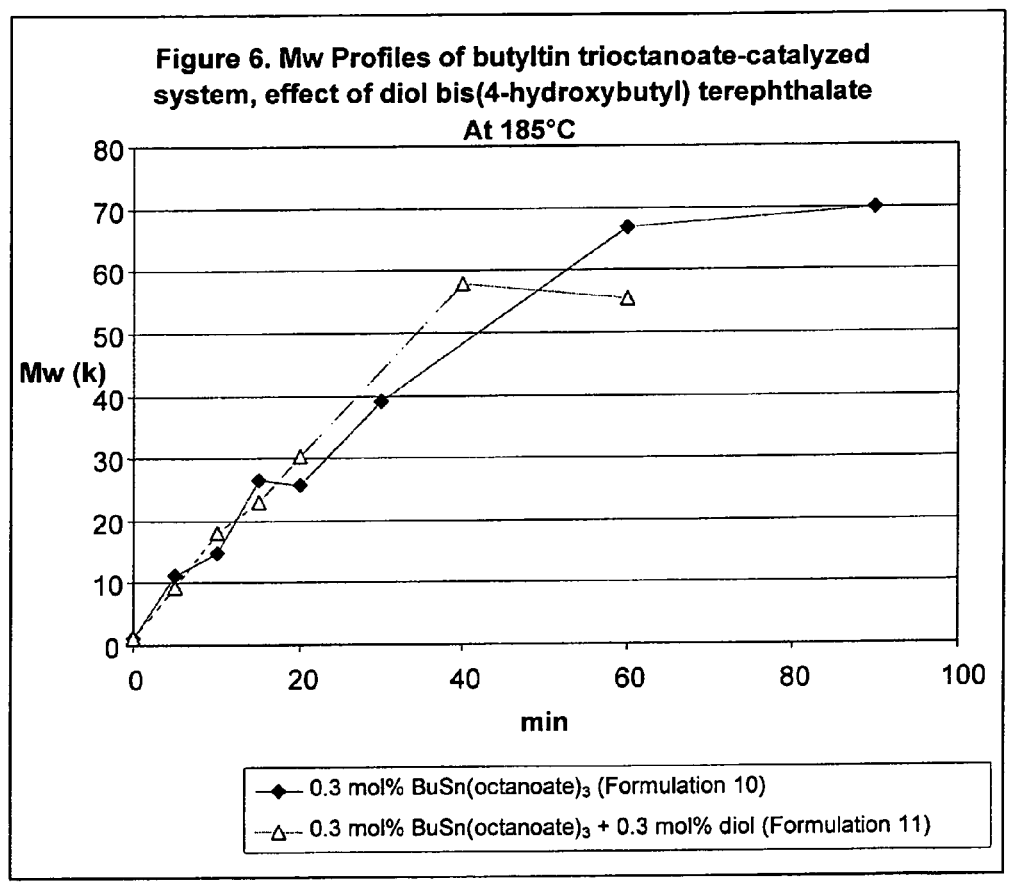

US 7,256,241 B2

METHODS FOR POLYMERIZING MACROCYCLIC POLYESTER OLIGOMERS USING CATALYST PROMOTERS

PRIOR APPLICATIONS

This application is a continuation-in-part of U.S. patent application Ser. No. 10/408,753, filed on Apr. 7, 2003, and issued as U.S. Pat. No. 6,994,914, which is a continuation of U.S. patent application Ser. No. 10/195,853, filed on Jul. 15, 2002, and issued as U.S. Pat. No. 6,639,009, which is a continuation of U.S. patent application Ser No. 09/754,943, filed on Jan. 4, 2001, and issued as U.S. Pat. No. 6,420,047, which is a continuation-in-part of U.S. patent application Ser. No. 09/535,132, filed on Mar. 24, 2000, and issued as U.S. Pat. No. 6,369,157, which claims benefit of U.S. Provisional Patent Application No. 60/177,727, filed on Jan. 21, 2000, the descriptions of which are incorporated herein by reference in their entirety. This application is also a continuation-in-part of U.S. patent application Ser. No. 11/091,721, filed on Mar. 28, 2005 and issued as U.S. Pat. No. 7,186,666, which is a divisional of U.S. patent application Ser. No. 10/102,162, filed on Mar. 20, 2002, and issued as U.S. Pat. No. 6,906,147, the descriptions of which are incorporated herein by reference in their entirety.

FIELD OF THE INVENTION

This invention relates generally to the polymerization of macrocyclic polyester oligomers. More particularly, in certain embodiments, the invention relates to the use of catalyst promoters to accelerate the polymerization of macrocyclic polyester oligomers.

BACKGROUND OF THE INVENTION

Macrocyclic polyester oligomers (MPOs) have unique physical properties that facilitate the manufacture of polyester products. MPOs demonstrate certain processing advantages of thermosets, yet can be polymerized to form thermoplastic polyesters which provide superior toughness, excellent chemical resistance, high heat resistance, and are thermoformable, paintable, bondable, weldable, and recyclable. For example, MPO resins are available as easy-to-handle solid pellets that melt into a low viscosity fluid when heated. The low melt viscosity allows the MPO resin to easily fill molds or permeate fabrics to make prepregs. Furthermore, certain MPOs melt and polymerize at temperatures well below the melting point of the resulting polymer. Upon melting and in the presence of an appropriate catalyst, polymerization and crystallization can occur virtually isothermally, without significant heat generation and without production of volatile organic compounds (VOCs) or other harmful emissions. The polymerized product can be released without cooling the mold, and the time and expense required to thermally cycle a tool is favorably reduced.

Laboratory experiments demonstrate it is possible to perform a (reversible) ring-opening polymerization of MPO in the presence of an appropriate catalyst. However, the development of industrial processes and equipment for the catalytic polymerization of MPO in the manufacture of polymer parts and composites has been limited. The design of industrial polymerization processes is difficult, for example, because the polymerization rate and maximum conversion often vary as functions of the geometry of the part, the reaction temperature, the reaction time, the method of mixing during reaction, the type and concentration of catalyst, and/or the concentrations of other components. There are also material handling and heating concerns that must be considered in the design of industrial manufacturing processes. Even where it is possible to accurately model the heat and mass transfer and reaction kinetics for a given catalytic system, it may be impossible to design a process that is versatile enough to provide adequate polymerization rates and conversions for the successful manufacture of certain products.

Thus, there is a need for catalytic systems of increased versatility to better control the onset and speed of polymerization of MPOs. For example, there is a need for catalytic systems which do not appreciably begin to catalyze MPO polymerization until an appropriate time, and which allow the polymerization to take place quickly, completely, and relatively homogeneously throughout the reaction mixture once reaction begins. There is also a need for simpler, more versatile, and lower-cost processes for manufacturing thermoplastic parts.

SUMMARY OF THE INVENTION

A blend material comprising a macrocyclic polyester oligomer (MPO) and a polymerization catalyst provides superior processing characteristics relative to conventional thermoplastics precursors. A mixture of a macrocyclic polyester oligomer and a polymerization catalyst can remain stable at ambient temperature and can have a long shelf life without premature polymerization of MPO or deactivation of the catalyst.

The ring-opening polymerization of MPOs with certain catalyst compounds of low catalytic activity can be accelerated by the presence of a promoter, such as an alcohol or an epoxide. Thus, polymerization can be accelerated on demand by addition of a promoter to a mixture of MPO and catalyst.

Additionally, even with the promoter, certain blends of MPO, polymerization catalyst, and promoter remain stable at ambient temperature and can have a long shelf life without premature polymerzation of SO or deactivation of the catalyst.

Thus, in certain embodiments, the invention provides pre-mixed formulations containing MPO, catalyst, and promoter that are substantially stable at ambient temperature for a period of time without premature polymerization of MPO or deactivation of catalyst. When it is desired to polymerize the MPO, the blend is exposed to a temperature sufficient to melt and polymerize the MPO, whereupon polymerization and crystallization may occur substantially isothermally. The blend material forms a low viscosity fluid, then rapidly polymerizes to form a high molecular weight polyester which solidifies to form a semi-crystalline polymer. For example, a blend containing catalyst, promoter, and the MPO poly(1,4-butylene terephthalate) can be introduced directly into a mold, where it is exposed to a mold temperature from about 180° C. to about 200° C. The product can be demolded at or near the polymerization temperature, for example, because the resulting polyester polymer solidifies fairly rapidly at these temperatures without having to cool the mold.

In other embodiments, the invention provides systems in which the catalyst and promoter are employed in two separate streams, either or both of which include MPO. In such systems, polymerization may be accelerated by contacting the two streams at a sufficiently high temperature.

Where a blend of MPO, catalyst, and promoter is used as a one-part, ready-to-use system—or where catalyst and promoter are used in separate streams—polymerization of the MPO may take place in any of one or more molding, casting, or forming processes, including (without limitation) an injection molding process, a rotational molding process, a compression molding process, a resin transfer molding process, a resin film infusion process, a solvent prepreg process, a hot melt prepreg process, an extrusion process, a pultrusion process, a filament winding process, a roll wrapping process, a water slurry process, a powder coating process, and combinations thereof, with or without reinforcement. These processes may be used to form polyesters and/or polymer compositions that are used in articles of manufacture such as carbon fiber golf shafts and lightweight automobile chassis, among many other possible applications.

Polymerization of the MPO may occur in situ as the product is being formed, molded, cast, or otherwise processed. The blend material may be processed like a thermoset while producing a thermoplastic product. Furthermore, in certain embodiments, the blend eliminates the need to modify existing equipment to allow for transfer of the MPO and the catalyst into the equipment in the appropriate amounts, at the appropriate time, and at the appropriate temperatures. Accordingly, greater production efficiency and lower manufacturing costs may be achieved.

Thus, in one aspect, the invention provides a blend material stable at ambient temperature for at least one week, the blend material including a macrocyclic polyester oligomer (MPO) and an organotin compound. The MPO preferably includes a macrocyclic poly(alkylene dicarboxylate) oligomer having a structural repeat unit of the formula:

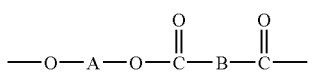

where A is an alkylene, or a cycloalkylene or a mono- or polyoxyalkylene group; and B is a divalent aromatic or alicyclic group. In certain embodiments, the MPO comprises at least one of the following: macrocyclic poly(1,4-butylene terephthalate), macrocyclic poly(1,3-propylene terephthalate), macrocyclic poly(1,4-cyclohexylenedimethylene terephthalate), macrocyclic poly(ethylene terephthalate), and macrocyclic poly(1,2-ethylene 2,6-naphthalenedicarboxylate) oligomers, and copolyester oligomers comprising two or more monomer repeat units. In one embodiment, the MPO includes butylene terephthalate units and ethylene terephthalate units. The MPO in the mixture may include one or more species. The species may have different degrees of polymerization.

The blend material may also include a promoter—where the promoter includes an alcohol, an epoxide, or both—yet still remain stable at ambient temperature for at least one week. In certain embodiments, the blend material is stable at ambient temperature for at least 2 weeks, at least 3 weeks, at least one month, at least two months, at least 6 months, at least 1 year, or longer. The promoter may include a mono-ol, a diol, a triol, and/or a higher polyol. The promoter may include a monoepoxide, a diepoxide, and/or a higher epoxide. In one embodiment the promoter includes butanol, decyl alcohol, octadecyl alcohol, ethylene glycol, propylene glycol, tetramethylene glycol, butanediol, 2-ethyl-1,3-hexanediol, polyethylene diol, polypropylene diol, polybutylene diol, poly(ethylene glycol), poly(propylene glycol), poly(tetramethylene glycol), bisphenol A diglycidyl ether, bis(4-hydroxybutyl)terephthalate, and/or polyethylene mono-ol. In certain embodiments, the promoter includes one or more reaction products of a diol and a dialkyl terephthalate, for example, reaction product(s) of butanediol and dimethyl terephthalate.

The blend material may contain the organotin compound present in an amount from about 0.01 to about 1.0 mole percent, from about 0.1 to about 1.0 mole percent, from about 1.0 to about 10 mole percent, or from about 0.1 to about 0.5 mole percent of the structural repeat units of the MPO. It is also possible to have more or less organotin compound present in the blend material. In certain embodiments, a masterbatch is made with a concentration of organotin compound in excess of the concentration that will be used during polymerization of the MPO. For example, a masterbatch may be created and stored, then diluted prior to polymerization. In some embodiments, a masterbatch is made which has organotin compound present in an amount from about 1.0 to about 10.0 mole percent of the structural repeat units of the MPO.

The organotin compound may include, for example, a dialkyltin oxide, a monoalkyltin hydroxide oxide, a monoalkyltin chloride dihydroxide, a monoalkyltin tricarboxylate, a dialkyltin dicarboxylate, a dialkylchlorotin oxide, and/or a bistrialkyltin oxide. For example, the organotin compound may comprise, consist of, or consist essentially of dibutyltin oxide, butyltin oxide hydroxide, butyltin trioctanoate, and/or dibutyltin dilaurate.

In certain embodiments, the organotin compound has formula (I):

where R is an alkyl group. The alkyl group may be branched or unbranched, cyclic or acyclic, and substituted or unsubstituted. R may contain substitution groups including halogen, alkoxy, and carbonyl groups, for example. Illustrative examples of alkyl groups include methyl, ethyl, propyl, isopropyl, n-butyl, isobutyl, and pentyl groups.

Alternatively, or additionally, the organotin compound may have formula (II):

where each R group independently is, or two or more R groups taken together are, an alkyl group. The alkyl group(s) may be branched or unbranched, cyclic or acyclic, and substituted or unsubstituted. R may contain substitution groups including halogen, alkoxy, and carbonyl groups, for example. Additionally, two or more R groups may be attached to form an alkyl group, which may be branched or unbranched, cyclic or acyclic, and substituted or unsubstituted.

Alternatively, or additionally, the organotin compound may have formula (III):

where each R group independently is, or two or more R groups taken together are, an alkyl group. The alkyl group(s) may be branched or unbranched, cyclic or acyclic, and substituted or unsubstituted. R may contain substitution groups including halogen, alkoxy, and carbonyl groups, for example. Additionally, two or more R groups may be attached to form an alkyl group, which may be branched or unbranched, cyclic or acyclic, and substituted or unsubstituted.

Certain embodiments of the invention are directed to a composition including a blend of MPO and an organotin compound (with or without promoter), in addition to a fibrous substrate.

In another aspect, the invention provides a method for increasing the rate of polymerization of an MPO, the method including the steps of providing a mixture of an MPO and a catalyst, and contacting the mixture with a promoter, thereby increasing the rate of polymerization of the MPO. In one embodiment, contact with the promoter triggers acceleration of polymerization of the MPO. In certain embodiments, the catalyst has low catalytic activity until contact with the promoter.

In certain embodiments, the MPO comprises at least one of the following: macrocyclic poly(1,4-butylene terephthalate), macrocyclic poly(1,3-propylene terephthalate), macrocyclic poly(1,4-cyclohexylenedimethylene terephthalate), macrocyclic poly(ethylene terephthalate), and macrocyclic poly(1,2-ethylene 2,6-naphthalenedicarboxylate) oligomers, and copolyester oligomers comprising two or more monomer repeat units. In one embodiment, the MPO includes butylene terephthalate units and ethylene terephthalate units. The MPO in the mixture may include one or more species. The species may have different degrees of polymerization.

The catalyst may include, for example, a dialkyltin oxide, a monoalkyltin hydroxide oxide, a monoalkyltin chloride dihydroxide, a monoalkyltin tricarboxylate, a dialkyltin dicarboxylate, a dialkylchlorotin oxide, and/or a bistrialkyltin oxide. For example, the catalyst may comprise, consist of, or consist essentially of dibutyltin oxide, butyltin oxide hydroxide, butyltin trioctanoate, and/or dibutyltin dilaurate.

In certain embodiments, the catalyst may include a compound that has formula (I):

R—Sn(OH)O     (I)

where R is an alkyl group. The alkyl group may be branched or unbranched, cyclic or acyclic, and substituted or unsubstituted. R may contain substitution groups including halogen, alkoxy, and carbonyl groups, for example.

Alternatively, or additionally, the catalyst may include a compound that has formula (II):

R—Sn(OOC—R)$_3$     (II)

where each R group independently is, or two or more R groups taken together are, an alkyl group. The alkyl group(s) may be branched or unbranched, cyclic or acyclic, and substituted or unsubstituted. R may contain substitution groups including halogen, alkoxy, and carbonyl groups, for example. Additionally, two or more R groups may be attached to form an alkyl group, which may be branched or unbranched, cyclic or acyclic, and substituted or unsubstituted.

Alternatively, or additionally, the catalyst may include a compound that has formula (III):

R$_2$—Sn(OOC—R)$_2$     (III)

where each R group independently is, or two or more R groups taken together are, an alkyl group. The alkyl group(s) may be branched or unbranched, cyclic or acyclic, and substituted or unsubstituted. R may contain substitution groups including halogen, alkoxy, and carbonyl groups, for example. Additionally, two or more R groups may be attached to form an alkyl group, which may be branched or unbranched, cyclic or acyclic, and substituted or unsubstituted.

In certain embodiments, the catalyst includes a titanium-containing compound, for example, isopropoxytitanium tricarboxylate, diisopropyltitanium dicarboxylate, and/or alkoxytitanium lactate. In certain embodiments, the titanium-containing compound has low catalytic activity until contact with the promoter.

The promoter may include a mono-ol, a diol, a triol, and/or a higher polyol. The promoter may include a monoepoxide, a diepoxide, and/or a higher epoxide. In one embodiment the promoter includes butanol, decyl alcohol, octadecyl alcohol, ethylene glycol, propylene glycol, tetramethylene glycol, butanediol, 2-ethyl-1,3-hexanediol, polyethylene diol, polypropylene diol, polybutylene diol, poly(ethylene glycol), poly(propylene glycol), poly(tetramethylene glycol), bisphenol A diglycidyl ether, bis(4-hydroxybutyl)terephthalate, and/or polyethylene mono-ol. In certain embodiments, the promoter includes one or more reaction products of a diol and a dialkyl terephthalate, for example, reaction product(s) of butanediol and dimethyl terephthalate.

In certain embodiments, the catalyst includes a dialkyltin oxide, a dialkylchlorotin oxide, a monoalkyltin hydroxide oxide, a monoalkyltin chloride dihydroxide, a monoalkyltintricarboxylate, a dialkyltin dicarboxylate, and/or a bistrialkyltin oxide, where the promoter includes an alcohol, an epoxide, or both.

The method for increasing the rate of polymerization of the MPO may further include changing the concentration of the promoter, changing the concentration of the catalyst, and/or changing the temperature of the mixture, thereby controlling the rate of polymerization of the MPO.

In certain embodiments, the step of contacting the mixture with the promoter includes contacting two separate streams in a reaction injection molding process, where one of the streams includes the MPO and the catalyst, and the other stream includes the promoter. The stream including the promoter may optionally include MPO and/or a filler. The contacting step may occur at a temperature from about 140° C. to about 260° C. In preferred embodiments, the MPO is melted or melting during the contacting step. In certain embodiments, the contacting step takes place in a process for in situ polymerization of the MPO. The in situ polymerization process may be a molding process, an extrusion process, a rotational molding process, a compression molding process, an injection molding process, a resin transfer molding process, or any combination thereof. The extrusion process may be, for example, a profile extrusion process.

In yet another aspect, the invention provides a catalytic system for the polymerization of a macrocyclic polyester oligomer, the system including: (1) a first component including an organotin compound; and (2) a second component with an alcohol, an epoxide, or both. The catalytic system demonstrates increased catalytic activity in the polymerization of MPO than a catalytic system including the first component or the second component alone.

The organotin compound may include, for example, a dialkyltin oxide, a monoalkyltin hydroxide oxide, a monoalkyltin chloride dihydroxide, a monoalkyltin tricarboxylate, a dialkyltin dicarboxylate, a dialkylchlorotin oxide, and/or a bistrialkyltin oxide. For example, the organotin compound may comprise, consist of, or consist essentially of butyltin oxide, dibutyltin oxide hydroxide, butyltin trioctanoate, and/or dibutyltin dilaurate.

In certain embodiments, the organotin compound has formula (I):

R—Sn(OH)O     (I)

where R is an alkyl group. The alkyl group may be branched or unbranched, cyclic or acyclic, and substituted or unsubstituted. R may contain substitution groups including halogen, alkoxy, and carbonyl groups, for example. Illustrative examples of alkyl groups include methyl, ethyl, propyl, isopropyl, n-butyl, isobutyl, and pentyl groups.

Alternatively, or additionally, the organotin compound may have formula (II):

R—Sn(OOC—R)$_3$     (II)

where each R group independently is, or two or more R groups taken together are, an alkyl group. The alkyl group(s) may be branched or unbranched, cyclic or acyclic, and substituted or unsubstituted. R may contain substitution groups including halogen, alkoxy, and carbonyl groups, for example. Additionally, two or more R groups may be attached to form an alkyl group, which may be branched or unbranched, cyclic or acyclic, and substituted or unsubstituted.

Alternatively, or additionally, the organotin compound may have formula (III):

$$R_2-Sn(OOC-R)_2 \qquad (III)$$

where each R group independently is, or two or more R groups taken together are, an alkyl group. The alkyl group(s) may be branched or unbranched, cyclic or acyclic, and substituted or unsubstituted. R may contain substitution groups including halogen, alkoxy, and carbonyl groups, for example. Additionally, two or more R groups may be attached to form an alkyl group, which may be branched or unbranched, cyclic or acyclic, and substituted or unsubstituted.

In certain embodiments of the catalytic system, the second component includes a mono-ol, a diol, a triol, and/or a higher polyol. Alternatively or additionally, the second component may include a monoepoxide, a diepoxide, and/or a higher epoxide. In certain embodiments, the second component includes butanol, decyl alcohol, octadecyl alcohol, ethylene glycol, propylene glycol, tetramethylene glycol, butanediol, 2-ethyl-1,3-hexanediol, polyethylene diol, polypropylene diol, polybutylene diol, poly(ethylene glycol), poly(propylene glycol), poly(tetramethylene glycol), bisphenol A diglycidyl ether, bis(4-hydroxybutyl)terephthalate, and/or polyethylene mono-ol. In certain embodiments, the second component includes one or more reaction products of a diol and a dialkyl terephthalate, for example, reaction product(s) of butanediol and dimethyl terephthalate.

The MPO in the catalytic system preferably includes a macrocyclic poly(alkylene dicarboxylate) oligomer having a structural repeat unit of the formula:

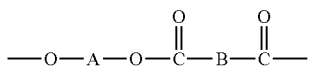

where A is an alkylene, or a cycloalkylene or a mono- or polyoxyalkylene group; and B is a divalent aromatic or alicyclic group. In certain embodiments, the MPO comprises at least one of the following: macrocyclic poly(1,4-butylene terephthalate), macrocyclic poly(1,3-propylene terephthalate), macrocyclic poly(1,4-cyclohexylenedimethylene terephthalate), macrocyclic poly(ethylene terephthalate), and macrocyclic poly(1,2-ethylene 2,6-naphthalenedicarboxylate) oligomers, and copolyester oligomers comprising two or more monomer repeat units. In one embodiment, the MPO includes butylene terephthalate units and ethylene terephthalate units. The MPO in the mixture may include one or more species. The species may have different degrees of polymerization.

In certain embodiments, the first component of the catalytic system includes a dialkyltin oxide, a dialkylchlorotin oxide, a monoalkyltin hydroxide oxide, a monoalkyltin chloride dihydroxide, a monoalkyltin tricarboxylate, a dialkyltin dicarboxylate, and/or a bistrialkyltin oxide, where the second component of the catalyst system includes one or more alcohols, epoxides, or both.

In yet another aspect, the invention provides a process for preparing a blend material, the process including the steps of providing an MPO, contacting the MPO and an organotin compound—and, optionally, a promoter—to produce a blend material, and storing the blend material for at least one week. In certain embodiments, the blend material is stored for at least two weeks, at least three weeks, at least a month, at least two months, at least three months, at least 6 months, at least a year, or longer. In preferred embodiments, the blend material is stored at or below ambient temperature, and the MPO of the blend material remains substantially unpolymerized and the organotin compound is not substantially deactivated during storage.

In certain embodiments of the process for preparing the blend material, the MPO and organotin compound are contacted at a temperature within a range from about 70° C. to about 150° C., for example, to produce the blend. The contacting step may be conducted in an extruder—for example, a single-screw or twin-screw extruder—in a blender—for example, a Helicone® blender and/or a Brablender®—in a pre-mold mixer, in a mold, or in any combination thereof.

In certain embodiments, the blend material includes a promoter. The promoter may include a mono-ol, a diol, a triol, and/or a higher polyol. The promoter may include a monoepoxide, a diepoxide, and/or a higher epoxide. In one embodiment the promoter includes butanol, decyl alcohol, octadecyl alcohol, ethylene glycol, propylene glycol, tetramethylene glycol, butanediol, 2-ethyl-1,3-hexanediol, polyethylene diol, polypropylene diol, poly(ethylene glycol), poly(propylene glycol), poly(tetramethylene glycol), bisphenol A diglycidyl ether, bis(4-hydroxybutyl) terephthalate and/or polyethylene mono-ol. In certain embodiments, the promoter includes one or more reaction products of a diol and a dialkyl terephthalate, for example, reaction product(s) of butanediol and dimethyl terephthalate.

The process for preparing the blend material may further include the step of heating the blend material at a temperature within a range from about 140° C. to about 260° C. to polymerize the MPO. In certain one-part, ready-to-polymerize systems, the blend material contains promoter. In certain embodiments, the blend material is heated in the presence of fibers, for example, to produce reinforced composites. For example, a fibrous substrate impregnated or coated with the blend material may be heated to polymerize the MPO. In certain embodiments, the heating step is performed during resin transfer molding or compression molding.

The MPO preferably includes a macrocyclic poly(alkylene dicarboxylate) oligomer having a structural repeat unit of the formula:

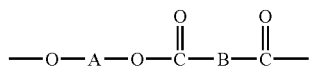

where A is an alkylene, or a cycloalkylene or a mono- or polyoxyalkylene group; and B is a divalent aromatic or alicyclic group. In certain embodiments, the MPO comprises at least one of the following: macrocyclic poly(1,4-butylene terephthalate), macrocyclic poly(1,3-propylene terephthalate), macrocyclic poly(1,4-cyclohexylenedimethylene terephthalate), macrocyclic poly(ethylene terephthalate), and macrocyclic poly(1,2-ethylene 2,6-naphthalenedicarboxylate) oligomers, and copolyester oligomers comprising two or more monomer repeat units. In one embodiment, the MPO includes butylene terephthalate units and ethylene terephthalate units. The MPO in the mixture may include one or more species. The species may have different degrees of polymerization.

The organotin compound may include, for example, a dialkyltin oxide, a monoalkyltin hydroxide oxide, a monoalkyltin chloride dihydroxide, a monoalkyltin tricarboxylate, a dialkyltin dicarboxylate, a dialkylchlorotin oxide, and/or a bistrialkyltin oxide. For example, the organotin compound may comprise, consist of, or consist essentially of dibutyltin oxide, butyltin oxide hydroxide, butyltin trioctanoate, and/or dibutyltin dilaurate.

In certain embodiments, the blend material does not contain promoter. Here, the process for preparing the blend material may further include contacting the blend material with a promoter to trigger acceleration of the polymerization of the MPO, where the promoter includes an alcohol, an epoxide, or both. This step may be conducted, for example, at a temperature within a range from about 140° C. to about 260° C. It is preferred that the blend material be substantially stable throughout the storing step and that the MPO in the blend material not substantially begin to polymerize until contact of the blend material with the promoter. In certain embodiments, the blend material is contained in a first stream and the promoter is contained in a second stream. In certain embodiments, the volume ratio of the first stream and the second stream is within a range from about 1:20 to about 100:1, from about 1:20 to about 20:1, or from about 1:3 to about 3:1. In certain embodiments, the first stream and the second stream are contacted during injection molding or during resin infusion into fiber. The promoter may include a mono-ol, a diol, a triol, and/or a higher polyol. The promoter may include a monoepoxide, a diepoxide, and/or a higher epoxide. In one embodiment the promoter includes butanol, decyl alcohol, octadecyl alcohol, ethylene glycol, propylene glycol, tetramethylene glycol, butanediol, 2-ethyl-1,3-hexanediol, polyethylene diol, polypropylene diol, polybutylene diol, poly(ethylene glycol), poly(propylene glycol), poly(tetramethylene glycol), bisphenol A diglycidyl ether, bis(4-hydroxybutyl)terephthalate and/or polyethylene mono-ol. In certain embodiments, the promoter includes one or more reaction products of a diol and a dialkyl terephthalate, for example, reaction product(s) of butanediol and dimethyl terephthalate.

BRIEF DESCRIPTION OF THE DRAWINGS

The objects and features of the invention can be better understood with reference to the drawings described below, and the claims.

FIG. 1 shows a graph of percent conversion as a function of time in the polymerization of the macrocyclic polyester oligomer cPBT for various experiments using dibutyltin oxide as catalyst both with and without a promoter (Experiments 1-10), according to to an illustrative embodiment of the invention.

FIG. 2 shows a graph of weight average molecular weight of the polymer product as a function of time in the polymerization of cPBT for experiments using dibutyltin oxide as catalyst both with and without a promoter (Experiments 1-10), according to an illustrative embodiment of the invention.

FIG. 3 shows a graph of percent conversion as a function of time in the polymerization of the macrocyclic polyester oligomer cPBT for various experiments using either dibutyltin dilaurate or butyltin oxide hydroxide as catalyst, both with and without a promoter (Experiments 11-16), according to an illustrative embodiment of the invention.

FIG. 4 shows a graph of weight average molecular weight of the polymer product as a function of time in the polymerization of cPBT for experiments using either dibutyltin dilaurate or butyltin oxide hydroxide as catalyst, both with and without a promoter (Experiments 11-16), according to an illustrative embodiment of the invention.

FIG. 5 shows a graph of percent conversion as a function of time in the polymerization of the macrocyclic polyester oligomer cPBT for experiments using butyltin trioctanoate as catalyst, both with and without a promoter, bis(4-hydroxybutyl)terephthalate (Experiments 17-21), according to an illustrative embodiment of the invention.

FIG. 6 shows a graph of weight average molecular weight of the polymer product as a function of time in the polymerization of cPBT for experiments using butyltin trioctanoate as catalyst, both with and without a promoter, bis(4-hydroxybutyl)terephthalate (Experiments 17-21), according to an illustrative embodiment of the invention.

DETAILED DESCRIPTION

Embodiments of this invention reflect at least four technological advances in the field of thermoplastics manufacturing. First, it is possible to create stable mixtures of MPO and polymerization catalyst that can be stored in a convenient form and that can be polymerized to form thermoplastic parts. Second, MPOs offer various processing advantages, for example, MPO exhibits low melt viscosity and polymerizes at temperatures well below the melting point of the resulting polymer. Thus, melt flow, polymerization, and crystallization can occur isothermally, polymerization can be conducted at lower temperatures with little or no heat generation, and the time and expense required to thermally cycle a tool is favorably reduced. Third, the ring-opening polymerization of MPOs with certain catalyst compounds having low catalytic activity can be accelerated by the presence of a promoter, such as an alcohol or an epoxide. Thus, polymerization can be accelerated on demand by addition of a promoter to a mixture of MPO and catalyst. Fourth, even with the promoter, certain blends of MPO, polymerization catalyst, and promoter remain stable at ambient temperature and can have a long shelf life without premature polymerization of MPO or deactivation of the catalyst.

In certain embodiments, the invention relates to a one-part, ready-to-polymerize blend including MPO, a polymerization catalyst, and, optionally, a promoter. The blend may also contain one or more fillers and/or other substances. The one-part blend remains stable for at least a day, at least 2 days, at least 3 days, at least a week, at least a month, or at least a year or more, without significant premature polymerization of MPO and without significant deactivation of catalyst. When it is desired to polymerize the MPO, the one-part blend is exposed to a temperature sufficient to melt and polymerize the MPO, whereupon polymerization and crystallization may occur substantially isothermally.

Multi-component catalytic systems have also been developed which provide increased versatility, for example, allowing improved ability to precisely control the onset of any appreciable reaction and to provide introduction mechanisms that do not involve large volume ratios of reactants to catalyst—and, in certain embodiments, ratios of reactants to promoters and/or catalyst to promoter—before or during contact in process equipment, such as a mold, a mixer, or a blender. Separate components of such a catalytic system may be divided among two or more streams of reactant(s) of comparable volume. Appreciable reaction of the reactant(s) can be effectively delayed until each of the components of the catalytic system are brought into contact. Because the catalyst and the promoter are separated among two or more streams, acceleration of the reaction does not occur until the two or more streams are brought into contact with each other. The individual components may be introduced to individual streams of reactant in advance of the contact of all the streams, so that there is sufficient time or sufficient intermediary processing steps for the sufficient mixing of the relatively small amounts of components of the catalytic system with the relatively large amounts of reactant. Since the streams of reactant may be maintained at comparable volumes, there is no need for special mixing or metering equipment that is required in processes which require dispersal of a relatively small quantity of a single catalyst into a relatively large volume of reactant mixture. Upon contact of the streams, the reaction may occur quickly and homogeneously.

For example, two-component catalytic systems have been developed for the polymerization of macrocyclic oligoesters wherein each component can be mixed with molten macrocyclic oligoester, thereby permitting two separate reactant streams. Each separate stream is relatively inactive over a period of time, ranging from minutes to hours, allowing sufficient time for mixing of the individual components of the catalytic system with the macrocyclic oligoester. Upon contact of the two streams—for example, inside a mold, a mixer, or a blender—the polymerization reaction speeds up, and the polymerization of macrocyclic oligoester may be complete within minutes. Because the volume ratio of each of the two streams may be maintained, for example, in the range from about 1:1 to about 20:1, or from about 1:1 to about 3:1, there is reduced need for sophisticated metering and mixing equipment. Also, since certain MPOs melt and polymerize at temperatures well below the melting point of the resulting polymer, polymerization and crystallization can occur virtually isothermally. Thus, a polymerized product may be removed from a mold without cooling it following polymerization.

In certain embodiments where two streams are brought into contact, one stream may contain a stable mixture of NPO and catalyst while the other stream contains a stable mixture of MPO and promoter. Reaction is accelerated upon contact of the two streams at reaction temperature. Alternatively, the catalyst and/or the promoter may be brought into contact with MPO at reaction conditions without pre-mixing the catalyst and/or the promoter with the MPO.

It is possible to control the rate of reaction and/or the molecular weight of the polymerization product by varying reaction conditions. Reaction conditions include, for example, concentration of catalytic system components, relative molar ratio of catalytic system components, temperature, method of mixing, and reactant concentrations. For example, it is possible to vary the relative molar ratio of the catalytic system components in order to shorten the time required for triggering substantial reaction upon mixing of the catalytic components, or to affect the molecular weight of the product.

It is contemplated that methods, systems, and processes of the claimed invention encompass scale-ups, variations, and adaptations developed using information from the embodiments described herein. For example, the invention includes pilot plant and plant-scale manufacturing processes whose feasibility is demonstrated by the laboratory-scale experiments described herein. Processes described herein may be conducted in batch, semi-continuous, and/or continuous operation. Scale-up of systems from laboratory to plant scale may be performed by those of ordinary skill in the field of polymer manufacturing and processing. For example, those of ordinary skill in this field may select process equipment, design experiments for obtaining kinetic data, develop and apply models for equipment and process design, develop economically optimum equipment and process design, and/or validate equipment and process designs via pilot plant and/or full scale reactor experiments. It is also contemplated that methods, systems, and processes of the claimed invention may include pumps, heat exchangers, and gas-, liquid-, and/or solid-phase material handling equipment known to those of ordinary skill in the field of polymer manufacturing and processing.

Throughout the description, where compositions, mixtures, blends, and composites are described as having, including, or comprising specific components, or where processes and methods are described as having, including, or comprising specific steps, it is contemplated that, additionally, there are compositions, mixtures, blends, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

The following general definitions may be helpful in understanding the various terms and expressions used in this specification.

Definitions

As used herein, "macrocyclic" is understood to mean a cyclic molecule having at least one ring within its molecular structure that contains 5 or more atoms covalently connected to form the ring.

As used herein, an "oligomer" is understood to mean a molecule that contains one or more identifiable structural repeat units of the same or different formula.

As used herein, a "macrocyclic polyester oligomer" (MPO) is understood to mean a macrocyclic oligomer containing structural repeat units having an ester functionality. A macrocyclic polyester oligomer typically refers to multiple molecules of one specific repeat unit formula. However, a macrocyclic polyester oligomer also may include multiple molecules of different or mixed formulae having varying numbers of the same or different structural repeat units. In addition, a macrocyclic polyester oligomer may be a co-polyester or multi-component polyester oligomer, i.e., an oligomer having two or more different structural repeat units having ester functionality within one cyclic molecule.

As used herein, "substantially homo- or co-polyester oligomer" is understood to mean a polyester oligomer wherein the structural repeat units are substantially identical or substantially composed of two or more different structural repeat units, respectively.

As used herein, an "alkylene group" is understood to mean $-C_nH_{2n}-$, where $n \geq 2$.

As used herein, a "cycloalkylene group" is understood to mean a cyclic alkylene group, $-C_nH_{2n-x}-$, where x represents the number of H's replaced by cyclization(s).

As used herein, a "mono- or polyoxyalkylene group" is understood to mean $[-(CH_2)_m-O-]_n-(CH_2)_m-$, wherein m is an integer greater than 1 and n is an integer greater than 0.

As used herein, a "divalent aromatic group" is understood to mean an aromatic group with links to other parts of the macrocyclic molecule. For example, a divalent aromatic group may include a meta- or para-linked monocyclic aromatic group (e.g., benzene).

As used herein, an "alicyclic group" is understood to mean a non-aromatic hydrocarbon group containing a cyclic structure within.

As used herein, a "filler" is understood to mean a material other than a macrocyclic polyester oligomer or a polymerization catalyst that may be included in a blend containing MPO and which may be present in a polymer composition resulting from polymerization of an MPO-containing blend.

A filler may be used to achieve a desired purpose or property, and may be present or transformed into known and/or unknown substances in the resulting polyester polymer. For example, the purpose of the filler may be to provide stability, such as chemical, thermal, or light stability, to the blend material or the polymer composition; to increase the strength of the polymer composition/product; and/or to increase electrical and/or thermal conductivity of the blend material and/or the polymer composition. A filler also may provide or reduce color, provide weight or bulk to achieve a particular density, provide reduced gas and vapor permeability, provide flame or smoking resistance (i.e., be a flame retardant), be a substitute for a more expensive material, facilitate processing, and/or provide other desirable properties. Illustrative examples of fillers are, among others, graphite, exfoliated graphite, carbon nanotubes, carbon black, carbon fibers, buckminsterfullerene, diamond, anhydrous magnesium silicate (anhydrous talc), fumed silica, titanium dioxide, calcium carbonate, wollastonite, chopped fibers, fly ash, glass, glass fiber, milled glass fiber, glass microspheres, micro-balloons, crushed stone, nanoclay, linear polymers, monomers, branched polymers, engineering resin, impact modifiers, organoclays, and pigments. Multiple fillers may be included in MPO blends, for example, to achieve a balance of properties. For example, an impact modifier may be added to an MPO blend containing exfoliated graphite so that the resulting blend and/or polymer composition exhibits high impact resistance as well as high electrical conductivity.

As used herein, a "polymer composition" is understood to mean a polymeric material comprising filler.

The following headers are provided as a general organizational guide and do not serve to limit support for any given element of the invention to a particular section of the Description.

I. Macrocyclic Polyester Oligomer

A macrocyclic polyester oligomer may also be referred to as a macrocyclic oligoester and is abbreviated herein as MPO. Many different MPOs can readily be made and are useful in various embodiments of this invention. Thus, depending on the desired properties of the final polymer composition, the appropriate MPO(s) can be selected for use in its manufacture.

MPOs that may be employed in this invention include, but are not limited to, macrocyclic poly(alkylene dicarboxylate) oligomers having a structural repeat unit of the formula:

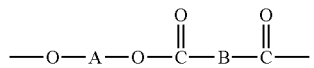

where A is an alkylene, or a cycloalkylene or a mono- or polyoxyalkylene group; and B is a divalent aromatic or alicyclic group.

Preferred MPOs include macrocyclic poly(1,4-butylene terephthalate) (cPBT), macrocyclic poly(1,3-propylene terephthalate) (cPPT), macrocyclic poly(1,4-cyclohexylene-dimethylene terephthalate) (cPCT), macrocyclic poly(ethylene terephthalate) (PET), and macrocyclic poly(1,2-ethylene 2,6-naphthalenedicarboxylate) (cPEN) oligomers, and copolyester oligomers comprising two or more of the above monomer repeat units.

MPOs may be prepared by known methods. Synthesis of the preferred MPOs may include the step of contacting at least one diol of the formula HO-A-OH with at least one diacid chloride of the formula:

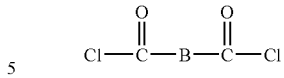

where A and B are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

MPOs have also been prepared via the condensation of a diacid chloride with at least one bis(hydroxyalkyl) ester such as bis(4-hydroxybutyl)terephthalate in the presence of a highly unhindered amine or a mixture thereof with at least one other tertiary amine such as triethylamine, in a substantially inert organic solvent such as methylene chloride, chlorobenzene, or a mixture thereof. See, e.g., U.S. Pat. No. 5,231,161 to Brunelle et al.

Another method for preparing MPOs is to depolymerize linear polyester polymers in the presence of an organotin or titanate compound. In this method, linear polyesters are converted to macrocyclic polyester oligomers by heating a mixture of linear polyesters, an organic solvent, and a trans-esterification catalyst such as a tin or titanium compound. The solvents used, such as o-xylene and o-dichlorobenzene, usually are substantially free of oxygen and water. See, e.g., U.S. Pat. No. 5,407,984 to Brunelle et al. and U.S. Pat. No. 5,668,186 to Brunelle et al. Production and depolymerization of low-acid polyalkylene terephthalate to prepare MPO is described in co-owned U.S. Patent Application No. 60/665,648, by Phelps et al., the text of which is incorporated by reference herein in its entirety.

MPOs have been prepared from intermediate molecular weight polyesters by contacting a dicarboxylic acid or a dicarboxylate in the presence of a catalyst to produce a composition comprising a hydroxyalkyl-terminated polyester oligomer. The hydroxyalkyl-terminated polyester oligomer is heated to produce a composition comprising an intermediate molecular weight polyester which preferably has a molecular weight between about 20,000 Daltons and about 70,000 Daltons. The intermediate molecular weight polyester is heated and a solvent is added prior to or during the heating process to produce a composition comprising an MPO. See, e.g., U.S. Pat. No. 6,525,164, to Faler.

MPOs that are substantially free from macrocyclic co-oligoesters have been prepared by depolymerizing polyesters using the organo-titanate catalysts described in co-owned U.S. Pat. No. 6,787,632, by Phelps et al., the text of which is incorporated by reference herein in its entirety.

It is also within the scope of the invention to employ macrocyclic homo- and co-polyester oligomers to produce homo- and co-polyester polymers, respectively. Therefore, unless otherwise stated, an embodiment of a composition, article, process, or method that refers to a macrocyclic polyester oligomer also includes a co-polyester embodiments.

In one embodiment, macrocyclic ester homo- and co-oligomers used in this invention include oligomers having a general structural repeat unit of the formula:

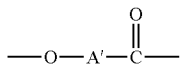

where A' is an alkylene, cycloalkylene, or mono- or polyoxyalkylene group, and where A' may be substituted, unsubstituted, branched, and/or linear. Example MPOs of this type include butyrolactone and caprolactone, where the degree of polymerization is one, and 2,5-dioxo-1,4-dioxane, and lactide, where degree of polymerization is two. The degree of polymerization may alternatively be 3, 4, 5, or higher. Molecular structures of 2,5-dioxo-1,4-dioxane and lactide, respectively, appear below:

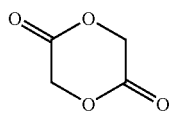 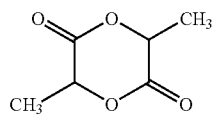

MPOs used in various embodiments of the invention generally include species of different degrees of polymerization. Here, a degree of polymerization (DP) with respect to the MPO means the number of identifiable structural repeat units in the oligomeric backbone. The structural repeat units may have the same or different molecular structure. For example, an MPO may include dimer, trimer, tetramer, pentamer, and/or other species.

In certain embodiments, the MPO is a composition comprising from about 30 to about 45 wt. % dimer species, from about 30 to about 45 wt. % trimer species, from about 0 to about 10 wt. % tetramer species, and from about 5 wt. % to about 20 wt. % pentamer species. MPO formulations outside these ranges may be used, as well. Certain embodiments of the invention may include modifying compositions of MPOs. Various exemplary methods of modifying compositions of MPOs are described in co-owned U.S. Pat. No. 6,436,548, by Phelps, the text of which is incorporated by reference herein in its entirety.

II. Polymerization Catalyst

Polymerization catalysts employed in certain embodiments of the invention are capable of catalyzing the polymerization of MPO. As with state-of-the-art processes for polymerizing MPOs, organotin and organotitanate compounds are the preferred catalysts, although other catalysts may be used. For example, catalysts which may be used include those described in co-owned U.S. Pat. No. 5,407,984 to Brunelle et al.; U.S. Pat. No. 5,498,651 to Brunelle; U.S. Pat. No. 5,527,976 to Takekoshi et al.; U.S. Pat. No. 5,661,214 to Brunelle et al.; and U.S. Pat. No. 5,710,086 to Brunelle et al., which are incorporated by reference herein, in their entirety.

In certain embodiments, the ring-opening polymerization of MPOs with a catalyst having low catalytic activity is accelerated by the presence of a promoter, such as an alcohol or an epoxide. The catalyst may include, for example, a dialkyltin oxide, a monoalkyltin hydroxide oxide, a monoalkyltin chloride dihydroxide, a monoalkyltin tricarboxylate, a dialkyltin dicarboxylate, a dialkylchlorotin oxide, and/or a bistrialkyltin oxide. For example, the catalyst may comprise, consist of, or consist essentially of dibutyltin oxide, butyltin oxide hydroxide, butyltin trioctanoate, and/or dibutyltin dilaurate.

In certain embodiments, the catalyst may include a compound that has any of formulas (I), (II), or (III):

$$R—Sn(OH)O \quad \text{(I)}$$
$$R—Sn(OOC—R)_3 \quad \text{(II)}$$
$$R_2—Sn(OOC—R)_2 \quad \text{(III)}$$

where each R group independently is, or two or more R groups taken together are, an alkyl group. The alkyl group(s) may be branched or unbranched, cyclic or acyclic, and substituted or unsubstituted. R may contain substitution groups including halogen, alkoxy, and carbonyl groups, for example. Additionally, two or more R groups may be attached to form an alkyl group, which may be branched or unbranched, cyclic or acyclic, and substituted or unsubstituted.

In certain embodiments, the catalyst includes a titanium-containing compound, for example, isopropoxytitanium tricarboxylate, diisopropyltitanium dicarboxylate, and/or alkoxytitanium lactate. In certain embodiments, the titanium-containing compound has low catalytic activity until contact with a promoter.

Other polymerization catalysts which may be used in the blend materials of the invention include aryl titanates, described, for example, in co-owned U.S. Pat. No. 6,906,147, by Wang, the text of which is incorporated by reference herein in its entirety. Also, polymer-containing organo-metal catalysts may be used in the invention. These include the polymer-containing catalysts described in co-owned U.S. Pat. No. 6,831,138, by Wang, the text of which is incorporated by reference herein in its entirety.

III. Promoter

The ring-opening polymerization of MPOs with a catalyst having low catalytic activity can be accelerated by the presence of a promoter, such as an alcohol or an epoxide. Thus, polymerization can be accelerated on demand by addition of a promoter to a mixture of MPO and catalyst. Additionally, even with the promoter, certain blends of MPO, polymerization catalyst, and promoter remain stable at ambient temperature and can have a long shelf life without premature polymerization of MPO or deactivation of the catalyst. Thus, in certain embodiments, the invention relates to pre-mixed formulations containing MPO, catalyst, and promoter that are substantially stable at ambient temperature for a period of time without premature polymerization of MPO or deactivation of catalyst. When it is desired to polymerize the MPO, the blend is exposed to a temperature sufficient to melt and polymerize the MPO, whereupon polymerization and crystallization may occur substantially isothermally. A blend of is MPO, catalyst, and promoter may be used as a one-part, ready-to-use system. Alternatively, the promoter and catalyst may be used in separate streams which are contacted at an elevated temperature in the presence of MPO, whereupon polymerization of the MPO is accelerated.

In certain embodiments, the promoter includes (or consists of, or consists essentially of) an alcohol and/or an epoxide. For example, the promoter may include a mono-ol, a diol, a triol, and/or a higher polyol. The promoter may include a monoepoxide, a diepoxide, and/or a higher epoxide. In certain embodiments the promoter includes butanol, decyl alcohol, octadecyl alcohol, ethylene glycol, butanediol, 2-ethyl-1,3-hexanediol, polyethylene diol, polypropylene diol, poly(ethylene glycol), poly(propylene glycol), poly(tetramethylene glycol), bisphenol diglycidyl ether, and/or polyethylene mono-ol.

IV. Blend Material

Certain embodiments of the invention provide a blend material and processes for preparing the blend material which includes a macrocyclic polyester oligomer, a polymerization catalyst, and, in some embodiments, a promoter.

The blend material allows for easy production, storage, transportation and processing. In certain embodiments, the blend material is a one-component ready-to-use mixture. In other embodiments, a blend of the MPO and the catalyst is used in combination with promoter. For example, in certain embodiments, a blend of MPO and catalyst is created, and a blend of MPO and promoter is prepared, where both blends are kept separate until it is desired that substantial polymerization of MPO begins.

The blend material may be processed like a thermoset, yet produces a thermoplastic. Furthermore, the blend material eliminates the need that existing equipment be modified to allow for transfer of the macrocyclic polyester oligomer and a polymerization catalyst into the equipment in the appropriate amounts at the appropriate time and at the appropriate temperature.

There is no limitation with respect to the physical form of the macrocyclic polyester oligomer when mixed with the polymerization catalyst and/or the promoter as long as the macrocyclic polyester oligomer remains substantially chemically intact. In one embodiment, the macrocyclic polyester oligomer is a solid such as a powder. In this embodiment, mechanical mixing typically is used to mix the macrocyclic polyester oligomer with a polymerization catalyst and/or promoter. In another embodiment, the macrocyclic polyester oligomer is mixed in the presence of a solvent with the solvent remaining present during the step of mixing.

In one embodiment, the blend material also includes a filler. Illustrative examples of such fillers include pigments, light weight fillers, flame retardants, and ultraviolet light stabilizers. For example, calcium carbonate may be used to increase the thickness of a polyester polymer product to improve its mechanical performance. Also, glass microspheres may be added to lower the density of the product. Other fillers include nanoclays, e.g., to increase the modulus of the product, organo bromides in combination with antimonium oxides, e.g., to impart flame resistance, and colorants such as carbon black or titanium dioxide. Fillers thus can be used to prepare polyester polymer composites.

The filler is added generally between about 0.1% and 70% by weight, between about 25% and 70% by weight, or between about 2% and 5% by weight depending on the filler and the purpose for adding the filler. For example, the percentage is preferably between 25% and 50% by weight in the case of calcium carbonate, between 2% and 5% by weight in the case of nanoclays, between 0.1% and 1% in the case of pigments, and between 25% and 70% by weight in the case of glass microspheres.

A process for preparing the blend material includes providing a macrocyclic polyester oligomer and mixing the macrocyclic polyester oligomer with a polymerization catalyst and/or a promoter. When preparing the blend, the macrocyclic polyester oligomer, the polymerization catalyst, and/or the promoter may be mixed together by various means and in various stages. For example, any conventional mixer, extruder, or blender may be employed to mix the macrocyclic polyester oligomer with the polymerization catalyst and/or the promoter via agitation at temperatures below the melting temperature of the macrocyclic polyester oligomer. This process may be conducted in the presence or absence of an inert atmosphere, such as a nitrogen atmosphere, and preferably while maintaining dry conditions. Furthermore, in a one-part, ready-to-use system including an MPO, a catalyst, and a promoter, the catalyst and the promoter may be mixed with the MPO in two separate steps, or the catalyst and the promoter may be mixed with the MPO at about the same time.

A solvent may also be employed to assist in the uniform mixing of the macrocyclic polyester oligomer with the polymerization catalyst and/or the promoter. Various solvents can be used, and there is no limitation with respect to the type of solvent that may be used other than that the solvent is substantially free of water. Illustrative examples of solvents that may be employed in the invention include o-dichlorobenzene, toluene, methanol, ethanol, isopropanol, acetone, methyl ethyl ketone, benzene, o-xylene, chlorobenzene, dichloromethane, and chloroform.

There is no limitation with respect to the amount of solvent to be employed other than that the amount results in a uniform mixing of the macrocyclic polyester oligomer and the polymerization catalyst. In one embodiment, the blend of macrocyclic polyester oligomer with the polymerization catalyst is isolated either by direct removal of the solvent via evaporation or by precipitation via addition of the mixture into a nonsolvent. In another embodiment, the blend of solid ingredients is further dried under vacuum at elevated temperatures below the melting temperature and the polymerization temperature of the macrocyclic polyester oligomer to remove any residual solvent.

A process for preparing the blend material further having at least one filler, or any other additional material, is generally the same as described above, however, the characteristics of the filler and/or additional materials must be considered. It should be understood that the macrocyclic polyester oligomer, the polymerization catalyst, the promoter, the filler, any additional material(s) and/or solvent, if used, may be mixed in any order or simultaneously as long as the final composition contains the appropriate amount of each ingredient.

It is within the scope of the invention to employ one, two, or more different fillers in preparing a blend material of macrocyclic polyester oligomer, polymerization catalyst, and, optionally, a promoter. Unless specifically stated otherwise, any embodiment of a composition, article or process that refers to filler in singular also includes an embodiment wherein two or more different fillers are employed. Similarly, unless stated otherwise, any embodiment of a composition, article or process that refers to fillers in plural also includes an embodiment wherein one filler is employed.

In one embodiment of the invention, the amount of polymerization catalyst employed is generally from about 0.01 to about 10.0 mole percent, preferably from about 0.1 to about 2 mole percent, and more preferably from about 0.2 to about 0.6 mole percent, based on total moles of monomer repeat units of the macrocyclic polyester oligomer. Stable masterbatch blends with catalyst present at these amounts, and in greater amounts (for example, up to about 30 mole percent or more), may be made as well, then diluted by addition of MPO prior to polymerization. The ratio of catalyst to promoter used—either as part of a one-part, ready-to-use system, or in a multi-part system in which the catalyst and promoter are kept apart until contact with MPO at reaction temperature—may be selected to provide desired results for a given system. For example, in certain embodiments, a catalyst-to-promoter molar ratio of about 10:1 to about 1:30 may be used, preferably from about 2:1 to about 1:10, and more preferably from about 1.5:1 to about 1:3.

Although dependent on the particular composition of the blend material, blend materials typically exhibit a shelf life generally longer than a week, and preferably longer than a month, and more preferably longer than a year when stored at or below ambient temperature. Blends containing MPO, catalyst, and, in some cases, promoter, may have a substantially stable shelf life of about 1 day, about 2 days, about 3 days, about a week, about 2 weeks, about 3 weeks, about a month, about 2 months, about 3 months, about 6 months, or about a year or more when stored at or below ambient temperature. Here, substantially stable indicates there is little or no premature polymerization of the MPO and there is little or no deactivation of the catalyst over the period of storage of the blend material.

It is within the scope of the invention to employ one, two or more different polymerization catalysts in preparing a blend of MPO, catalyst, and, optionally, promoter. For example, two or more polymerization catalysts may be used to vary the rate of polymerization and/or to produce polyesters with variable degrees of branching. It is also within the scope of the invention to employ one, two, or more different promoters in preparing a blend of MPO, catalyst, and promoter. Unless specifically stated otherwise, any embodiment of a composition, blend, mixture, article or process that refers to polymerization catalyst in singular also includes an embodiment wherein two or more different polymerization catalysts are employed. Also, unless specifically stated otherwise, any embodiment of a composition, blend, mixture, article or process that refers to a promoter in singular also includes an embodiment wherein two or more different promoters are employed. Furthermore, unless stated otherwise, any embodiment of a composition, blend, mixture, article or process that refers to polymerization catalyst in plural also includes an embodiment wherein one polymerization catalyst is employed. Similarly, unless stated otherwise, any embodiment of a composition, blend, mixture, article or process that refers to promoter in plural also includes an embodiment wherein one promoter is employed.

V. Polymerizing Macrocyclic Polyester Oligomers

In some aspects of the invention, various processes are employed to polymerize a macrocyclic polyester oligomer. For many of these processes, the unique properties of the macrocyclic polyester oligomers make it possible to use these processes advantageously. Generally, it was not previously contemplated that the use of macrocyclic polyester oligomers with these processes would be advantageous.

It is not necessary that a blend material as described above is employed in these processes, however, depending on the application, use of a blend material may be advantageous. It is contemplated that for processes in which a macrocyclic polyester oligomer, a catalyst, and, in certain embodiments, a promoter, are provided, it is possible to provide them separately. For example, a macrocylic polyester oligomer, a catalyst, and, optionally, a promoter, can be added to a reaction vessel at different times, or via different mechanisms. As another example, a mixture of the macrocyclic polyester oligomer, a catalyst, and, optionally, a promoter, can be made as they are added to a reaction vessel.

In one embodiment, a process for preparing a high molecular weight polyester polymer includes providing a blend material having a macrocyclic polyester oligomer, a polymerization catalyst, and, optionally, a promoter, and polymerizing the macrocyclic polyester oligomer. The blend material may include a filler. The filler may also be added prior to, during, or after the polymerization process. Any reaction vessel or other processing equipment may be employed that is substantially inert to the ingredients of the blend material.

Generally, the reaction vessel, mixing equipment, blending equipment, or other container or process equipment is charged with the blend material, or the blend material is otherwise introduced into the process equipment. Preferably, the macrocyclic polyester oligomer is polymerized by heating the macrocyclic polyester oligomer at an elevated temperature. Often the macrocyclic polyester oligomer is heated to above its melting point so it becomes less viscous and can be manipulated easier in processing. Subsequently, the temperature may be maintained or increased to accelerate polymerization and complete the polymerization reaction. In one embodiment, heat is supplied to melt the blend material at about 130° C. to about 250° C., preferably about 160° C. to about 220° C., and more preferably about 180° C. to about 190° C. to accelerate and complete polymerization. Stirring may be employed under an inert atmosphere in order to enhance polymerization of the macrocyclic polyester oligomer to produce the desired polyester polymer. In one embodiment, the polymerization is conducted under air atmosphere. In another embodiment, the polymerization is conducted under inert atmosphere.

Examples of polyesters produced by the processes of the invention include poly(ethylene terephthalate), poly(1,3-propylene terephthalate), poly(1,4-butylene terephthalate), poly(1,4-cyclohexylenedimethylene terephthalate), poly(1,2-ethylene 2,6-naphthalenedicarboxylate) and copolyesters comprising two or more of the above monomer repeat units.

In one aspect of the invention, articles are produced using the blend material (with or without fillers) via injection and rotational molding, resin film infusion, resin transfer molding, filament winding, powder coating to create a prepreg or film, hot melt prepreg preparation, compression molding, roll wrapping, water slurry, and pultrusion with or in some cases without reinforcement. In preferred embodiments, conditions allow for the polymerization of the blend to form high molecular weight polyester upon heating. Generally, most of such processes require that the resin to be processed have a low melt viscosity; therefore, conventional thermoplastic resins that have high melt viscosity are not suitable for processing. However, MPOs have low melt viscosity and are suitable.

Also, in processing conventional thermoplastic resins with such processes, the cooling of the mold after processing is required to solidify the melt. Demolding can occur only after such a cooling step. This results in longer processing time and increased energy usage. However, macrocyclic poly(1,4-butylene terephthalate) oligomers, for instance, polymerize at a temperature, from about 180° C. to about 200° C., that is lower than the melting point of the resulting polyester polymer which is about 220° C. In addition, poly(1,4-butylene terephthalate) has a favorable crystallization rate even at such temperatures. Thus, the resulting polyester polymer crystallizes without cooling the mold allowing polymerization and demolding to occur at the same temperature thereby reducing processing time and energy consumption.

A fast crystallization of the resulting polyester polymer may be desirable. Depending on the nature of the macrocyclic polyester oligomers, the nature of the resulting polymer, and the polymerization process employed, fast crystallization may need to be induced by cooling the mold or other process equipment wherein the polymerization occurred. For instance, in general, high molecular weight poly(1,4-butylene terephthalate) crystallizes fairly rapidly even at 180° C. to 200° C. while, in general, poly(ethylene terephthalate) requires cooling from such temperatures to achieve a favorable crystallization rate. In cases where the polyester polymers have a melting point higher than the polymerization temperature but does not crystallize at a favorable rate, agents, such as nucleating agents, which facilitate crystallization may be employed. In cases where the polyester polymers have a melting point lower than the polymerization temperature, cooling may be needed to bring about crystallization of the resulting polyester polymer.

In certain embodiments of processes involving polymerization of a macrocyclic polyester oligomer, no cycling (i.e., cooling and heating) the tools (e.g., the mold and/or other equipment) after polymerization is complete, is conducted. In other embodiments, some cooling is conducted. In yet other embodiments, an extruder, blender, and/or other mixer is employed to mix and deliver various materials needed, including the MPO(s), the polymerization catalyst(s), and/or the promoter(s) to the desired place.

VI. EXPERIMENTAL EXAMPLES

The experimental examples demonstrate preparation of exemplary stable, one-part, ready-to-polymerize blends comprising macrocyclic polyester oligomer (MPO), polymerization catalyst, and, in some cases, a promoter. The examples also demonstrate successful polymerization of these one-part, ready-to-polymerize blends, and show how promoters may be used to accelerate polymerization of MPO. The examples also illustrate the feasibility of embodiments described herein in which catalyst and promoter are introduced via separate streams, or are introduced at separate times in a given process.

Examples 1-16 employ the use of MPO manufactured by Cyclics Corporation of Schenectady, N.Y., that is primarily composed of macrocyclic poly(1,4-butylene terephthalate) oligomer. The MPO used in Examples 1-16 contains about 94 mol. % (1,4-butylene terephthalate) units and about 6 mol. % (2,2'-oxydiethylene terephthalate) units, and is referred to hereinbelow as cPBT, for simplicity. The MPO used in Examples 1-16 contains about 40.2 wt. % dimer species, about 39.0 wt. % trimer species, about 5.5 wt. % tetramer species, about 12.9 wt. % pentamer species, and about 2.4 wt. % higher oligomer species.

The polymerization catalysts used were dibutyltin oxide; dibutyltin dilaurate; butyltin oxide hydroxide; and butyltin tris(2-ethylhexanoate) also known as butyltin trioctanoate, all obtained from Sigma-Aldrich Corporation of St. Louis, Mo. The promoters used were ethylene glycol; 2-ethyl-1,3-hexanediol; and bisphenol A diglycidylether, all obtained from Sigma-Aldrich Corporation. Also, the diol, bis(4-hydroxybutyl)terephthalate, was used as a promoter in the polymerization of cPBT. This compound was prepared by reacting butanediol with dimethyl terephthalate, using titanium tetraisopropoxide as catalyst. The butanediol and dimethyl terephthalate used were obtained from Sigma-Aldrich Corporation, and the titanium tetraisopropoxide was obtained from E. I. duPont de Nemours and Company. Bis(4-hydroxybutyl) terephthalate is produced in methods described in co-owned U.S. Provisional Patent Application No. 60/665,648, relating to the preparation of low-acid polyalkylene terephthalate and cyclic oligomers thereof.

Example 1

Formulation 1—Blend Containing cPBT and $Bu_2SnO$ (Without Promoter)

The macrocyclic polyester oligomer cPBT (1.101 g, 5.0 mmol), the organotin compound dibutyltin oxide powder (74.7 mg, 0.30 mmol), and a magnetic stirring bar were placed in a vial which was capped with a septum. The vial contents were blanketed via nitrogen/vacuum cycles through a syringe needle connected to a vacuum/$N_2$ system. The mixture was dried at 90° C./vac for about 0.5 hr and then briefly melted at 170° C./vac with stirring. The molten mixture was cooled and annealed at 80° C. for 2 hours to allow for crystallization and then pulverized to a fine powder. 0.100 g of the resulting master batch powder was mixed with 1.900 g of cPBT powder to form a blend containing 0.3 mol % (based on butylene terephthalate monomer repeat units in cPBT) of the catalyst.

Example 2

Polymerization of Formulation 1

Approximately 0.3 g of Formulation 1 described in Example 1 was placed in a culture tube connected to a vacuum/$N_2$ system. The powder was dried at 90° C./vac for about 0.5 hr and then heated at 190° C. under $N_2$ for various polymerization times. The resulting product was quenched in ice water and then subjected to GPC analysis. The conversion to polymer was 13.2 and 46.0% for 5 and 10 minutes of polymerization time, respectively. Weight average molecular weights were 89,600 and 229,100 g/mol, respectively.

Example 3

Formulation 2—Blend Containing cPBT, $Bu_2SnO$, and Ethylene Glycol Promoter, Prepared in a Flask Finely pulverized organotin catalyst $Bu_2SnO$ (0.498 g, 2.00 mmol) and ethylene glycol (0.167 mL, 3.00 mmol) were mixed under nitrogen at room temperature in a 100 mL, 3-neck flask. To this mixture was added 8.368 g of cPBT (38 mmol butylene terephthalate monomer repeat units). The resulting free-flowing powder mixture was stirred under nitrogen at 120° C. for 30 minutes the yield of recovered white solid powder master batch was 8.77 g. A 0.300 g portion of the master batch was blended with finely pulverized cPBT powder at room temperature to produce 0.3 mol % catalyst Formulation 2.

Example 4

Polymerization of Formulation 2

Powder samples, each of about 0.30 g of Formulation 2, were each placed in a culture tube connected to a vacuum/$N_2$ system. The powder was dried at 90° C./vac for about 0.5 hr and then heated at 190° C. under $N_2$ for various polymerization times. The resulting product was quenched in ice water and then subjected to GPC analysis. The conversions were 66.0 and 95.7% for polymerization times of 3 minutes and 5 minutes, respectively, while the weight average molecular weights were 203,400 and 254,000 g/mol, respectively. The results demonstrate the potent acceleration power of ethylene glycol promoter in the polymerization of the macrocyclic polyester oligomer cPBT.

Example 5

Formulation 3—Blend Containing cPBT, $Bu_2SnO$, and Ethylene Glycol Promoter, Prepared via Extrusion Finely pulverized $Bu_2SnO$ (67.81 g, 0.2725 mol) and ethylene glycol (25.37 g, 0.4087 mol) were mixed at room temperature to form a slurry. Finely-powdered cPBT (100 g, 0.454 mol repeat units) was added to the above slurry and the mixture was stirred at room temperature to form a free-flowing white powder. The powder mixture was further blended with an additional 900 g (4.08 mol repeat units) of cPBT powder at room temperature. The resulting powder mixture was then extruded through a ½" Randcastle extruder at a barrel temperature of 135° C. Extrusion took 1.5 hours during which time the extrudate was quenched by continuously dropping into ice water, with stirring. The solidified extrudate was dried in a vacuum oven at 80° C. for 4 hours. The yield of the resulting master batch (6 mol % Sn based on mol of monomer repeat units) was 1080 g. Then, the finely pulverized master batch (0.150 g) and cPBT powder (2.850 g) were thoroughly blended at room temperature to produce the 0.3 mol % catalyst one-part blend, Formulation 3.

Example 6

Polymerization of Formulation 3

Powder samples, each of about 0.30 g of Formulation 3, were each placed in a culture tube connected to a vacuum/$N_2$ system. The powder was dried at 90° C./vac for about 0.5 hr and then heated at 190° C. under $N_2$ for various polymerization times. The resulting product was quenched in ice water and then subjected to GPC analysis. The conversions were 76.3% and 94.8% for polymerization times of 3 minutes and 5 minutes, respectively, while the weight average molecular weights were 198,900 and 235,500 g/mol, respectively.

Example 7

Formulation 4—Blend Containing cPBT, $Bu_2SnO$, and 2-ethyl-1,3-hexanediol Promoter, Prepared in a Flask Finely pulverized $Bu_2SnO$ (0.498 g, 2.00 mmol), 2-ethyl-1,3-hexanediol (0.39 mL, 2.5 mmol) and cPBT powder (8.368 g, 38.0 mmol repeat units) were placed in a 100 mL, 3-neck flask. The mixture was stirred at 110° C. under nitrogen for 0.5 hour and cooled. The resulting 5 mol % catalyst master batch was obtained in yield of 9.08 g. A portion of the master batch (0.500 g) was blended with 7.833 g of cPBT powder to form 0.3 mol % catalyst one-part blend, Formulation 4.

Example 8

Polymerization of Formulation 4

Powder samples, each of about 0.30 g of Formulation 3, were each placed in a culture tube connected to a vacuum/$N_2$ system. The powder was dried at 90° C./vac for about 0.5 hr and then heated at 190° C. under $N_2$ for various polymerization times. The resulting product was quenched in ice water and then subjected to GPC analysis. The conversions were 51.2% and 77.5% for polymerization times of 5 minutes and 10 minutes, respectively, while the weight average molecular weights were 210,100 and 281,800 g/mol, respectively. The results demonstrate the potent acceleration power of 2-ethyl-1,3-hexanediol promoter in the polymerization of the macrocyclic polyester oligomer cPBT.

Example 9

Formulation 5—Blend Containing cPBT, $Bu_2SnO$, and BPA-DGE Epoxide Promoter, Prepared in a Flask Bisphenol A diglycidylether (BPA-DGE) (0.681 g, 2.0 mmol) was dissolved in approximately 1 mL of toluene, and the solution was mixed at room temperature with finely pulverized $Bu_2SnO$ powder (0.498 g, 2.0 mmol) in a 100 mL flask. cPBT powder (8.81 g, 40.0 mmol) was added to the above slurry and the mixture was stirred and heated at 120° C. for 30 minutes during which time it was swept with a slow stream of nitrogen to evaporate toluene. The resulting granular solid master batch was cooled and pulverized. The yield was 9.55 g. this master batch 0.200 g was then mixed with 3.133 g of cPBT powder to produce 0.3 mol % catalyst Formulation 5.

Example 10

Polymerization of Formulation 5

Powder samples, each of about 0.30 g of Formulation 5, were each placed in a culture tube connected to a vacuum/$N_2$ system. The powder was dried at 90° C./vac for about 0.5 hr and then heated at 190° C. under $N_2$ for various polymerization times. The resulting product was quenched in ice water and then subjected to GPC analysis. The conversions were 44.9% and 83.2% for polymerization times of 5 minutes and 10 minutes, respectively, while the weight average molecular weights were 193,200 and 276,600 g/mol, respectively. The results demonstrate the moderate rate acceleration afforded by the epoxide promoter in the polymerization of the macrocyclic polyester oligomer cPBT.

Example 11

Formulation 6—Masterbatch Containing cPBT and 1 mol % Dibutyltin Dilaurate (Without Promoter)

cPBT (50.00 g, 0.227 mol) was placed in a 250 ml, 3-neck flask equipped with a stirrer and a gas-inlet adaptor. The cPBT was dried at 100° C. under vacuum for 0.5 h. The flask was heated in an oil bath at 190° C. and cPBT was allowed to melt under vacuum. After 12 min of heating at 190° C., the cPBT was cooled to 170° C. and was maintained at that temperature for 11 min. Dry nitrogen was allowed to fill the flask and dibutyltin dilaurate (1.434 g, 2.27 mmol) was added. The mixture was then stirred under vacuum for an additional two minutes, then the content of the flask was poured onto an aluminum tray. The material in the tray was annealed at 80° C. for one hour to allow crystallization. The crystalline solid was pulverized and the resulting powder, Formulation 6, was used as master batch to formulate various blend materials.

Example 12

Formulation 7 Containing cPBT and 0.3mol % Dibutyltin Dilaurate, and Polymerization Thereof Exactly 1.000 g of the master batch Formulation 6 and cPBT powder (2.333 g) were intimately blended to create Formulation 7. Approximately 1 g of the resulting blend was placed in a vial, which was capped with a septum. The vial was connected to a vacuum system via a hypodermic needle penetrating the septum. The vial content was dried at 90° C. under vacuum for 0.5 h and then was polymerized by heating at 190° C. under nitrogen. The polymerization conversion was 70.1% at polymerization time of 7.33 hours.

Example 13

Acceleration of Dibutyltin Dilaurate-Catalyzed Formulation with Bisphenol A Diglycidyl Ether as Promoter (Simulation of 2-Part System, Where Promoter is Introduced to Accelerate Polymerization of cPBT)

Exactly 1.00 g of Formulation 7 containing 0.3mol % dibutyltin dilaurate was placed in a vial capped with a septum, and connected to a vacuum system through a hypodermic needle penetrating the septum. The content of the vial was dried at 90° C. under vacuum for 0.5 hr and then melted at 190° C. When the contents of the vial had melted completely (about one minute), 4.6 mg (0.3 mol %) of bisphenol A diglycidyl ether (BPA-DGE) in the form of 50% toluene solution was added to the vial by use of a microsyringe, and polymerization was performed under nitrogen at 190° C. The polymerization conversion was 94.1% at a polymerization time of 6 hours.

Example 14

Formulation 8—Masterbatch Containing 3.0 mol % Butyltin Oxide Hydroxide

Master batch was prepared from 5.00 g of cPBT and 0.142 g of butyltin oxide hydroxide according to the procedure described in Example 1. cPBT (5.00 g, 22.7 mmol) was placed in a 250 ml, 3-neck flask equipped with a stirrer and a gas-inlet adaptor. The cPBT was dried at 100° C. under vacuum for 0.5 h. The flask was heated in an oil bath at 190° C. and cPBT was allowed to melt under vacuum. After 12 min of heating at 190° C., the cPBT was cooled to 170° C. and was maintained at that temperature for 11 min. Dry nitrogen was allowed to fill the flask and butyltin oxide hydroxide (0.142 g) was added. The mixture was then stirred under vacuum for an additional two minutes, then the content of the flask was poured onto an aluminum tray. The material in the tray was annealed at 80° C. for one hour to allow crystallization. The crystalline solid was pulverized and the resulting powder, Formulation 8, was used as master batch to formulate various blend materials.

Example 15

Formulation 9 Containing cPBT and 0.3mol % Butyltin Oxide Hydroxide, and Polymerization Thereof Finely pulverized cPBT powder (9.00 g) and the master batch, Formulation 8 (1.00 g), were blended intimately at room temperature. Approximately 1 g of the blend was placed in a vial, which was capped with a septum. The vial was connected to vacuum system via a hypodermic needle penetrating the septum. The vial content was dried at 90° C. under vacuum for 0.5 h, then was polymerized by heating at 190° C. under nitrogen. The polymerization conversions were 3.0, 45.7 and 82.9% at polymerization times of 15, 30 and 60 minutes, respectively.

Example 16

Acceleration of Butyltin Oxide Hydroxide-Catalyzed Formulation with Ethylene Glycol Promoter (Simulation of 2-Part System, where Promoter is Introduced to Accelerate Polymerization of cPBT)

Exactly 1.00 g of Formulation 9 containing cPBT and 0.3 mol % butyltin oxide hydroxide was placed in a vial capped with a septum, and connected to a vacuum system through a hypodermic needle penetrating the septum. The content of the vial was dried at 90° C. under vacuum for 0.5 hr and then melted at 190° C. under vacuum with magnetic stirring. When the contents had melted completely, the vial was filled with nitrogen, and 0.8 μl (0.3 mol %) of ethylene glycol was injected to the melt with vigorous magnetic stirring. The polymerization conversions were 21.7, 64.3, and 92.2% at 15, 30, and 60 min of polymerization, respectively.

Example 17

Formulation 10 Containing cPBT and 0.3 mol % Butyltin Trioctanoate cPBT (25.00 g, 0.1135 mol) was placed in a 100 ml, 3-neck flask equipped with a stirrer and a vacuum/nitrogen inlet. The cPBT was dried by heating at 90° C. under vacuum for 0.5 h and then heated at 210° C. When the cPBT was completely melted (about 10 min), it was cooled to 185° C. and then maintained at that temperature for 5 min. The flask was filled with nitrogen and 0.187 ml of butyltin tris(2-ethylhexanoate) was added with vigorous stirring. The stirring was continued for an additional minute under vacuum at 185° C., and the flask content was quenched by pouring out on aluminum foil tray. The quenched product was annealed at 80° C. for 2 h to crystallize. The crystalline solid was pulverized in a blender.

Example 18

Polymerization of Formulation 10

Powder samples, each of about 0.25 g of Formulation 10, were placed in culture tubes connected to a vacuum/$N_2$ system. After flashing via vacuum/nitrogen cycles, the content of each tube was dried at 80° C. under vacuum for 0.5 hr. Each tube was then heated at 185° C. under vacuum for one minute, then held under nitrogen for the required time. Each tube was immediately quenched by dipping in cold water, and the reaction product was analyzed by GPC. Polymer conversions were 13.0% and 30.3% after 20 min and 60 min of polymerization, respectively. The weight average molecular weights were 25,800 g/mol and 66,900 g/mol at 20 min and 60 min, respectively.

Example 19

Preparation of the diol, bis(4-hydroxybutyl)terephthalate, used as a Promoter

Butanediol (90.12 g, 1.00 mol), dimethyl terephthalate (19.41 g, 0.100 mol), and 0.2 ml of titanium tetraisopropoxide were placed in a 250 ml round bottom flask equipped with a magnetic stirrer. The contents were heated while stirring at 170° C. under nitrogen for 4 hours, during which time methanol was distilled off. The reaction mixture was cooled and the resulting solid was twice recrystallized from acetonitrile. The product had a melting point of 76° C. and was composed of 96.2% of bis(4-hydroxybutyl)terephthalate, the remaining part being higher oligomers, based on HPLC analysis.

Example 20

Formulation 11 Containing cPBT, 0.3 mol % butyltin trioctanoate and 0.3 mol % bis(4-hydroxybutyl)terephthalate Bis(4-hydroxybutyl)terephthalate (8.5 mg, 0.0272 mmol) was dissolved in 1.5 ml of toluene and the resulting solution was combined with 2.00 g (9.08 mmol) of the formulation described in Example 17. A paste obtained from the mixture was dried at about 80° C. under vacuum for 2 hr and pulverized.

Example 21

Polymerization of Formulation 11 Containing cPBT, 0.3 mol % butyltin trioctanoate and 0.3 mol % bis(4-hydroxybutyl)terephthalate Approximately 0.25 g each sample of Formulation 11 was polymerized according to the procedure described in Example 18. GPC analysis of the samples showed conversions of 23.1% and 55.3%, and weight average molecular weights of 30,200 g/mol and 55,300 g/mol, at 20 min and 60 min of polymerization time, respectively.

FIG. 1 shows a graph of percent conversion as a function of time in the polymerization of the macrocyclic polyester oligomer cPBT for Formulations 1-5 in Experimental Examples 1-10, using dibutyltin oxide as catalyst, both with and without a promoter. The graph indicates the various promoters are effective in accelerating polymerization of MPO when used with the dibutyltin oxide catalyst. This effect can be seen for polymerization conducted in a flask, as well as for polymerization conducted in an extruder.

FIG. 2 shows a graph of weight average molecular weight of the polymer product as a function of time in the polymerization of cPBT for Formulations 1-5 in Experimental Examples 1-10, using dibutyltin oxide as catalyst both with and without a promoter.

FIG. 3 shows a graph of percent conversion as a function of time in the polymerization of the macrocyclic polyester oligomer cPBT for Formulations in Experimental Examples 11-16, using either dibutyltin dilaurate or butyltin oxide hydroxide as catalyst, both with and without a promoter. The graph indicates the various promoters are effective in accelerating polymerization of MPO when used with the dibutyltin dilaurate or butyltin oxide hydroxide catalyst. Experimental Examples 13 and 16 illustrate the feasibility of embodiments in which catalyst and promoter are introduced via separate streams, or are introduced at separate times in a given process, where contact with the promoter accelerates polymerization of the MPO.

FIG. 4 shows a graph of weight average molecular weight of the polymer product as a function of time in the polymerization of cPBT for Formulations in Experimental Examples 11-16, using either dibutyltin dilaurate or butyltin oxide hydroxide as catalyst, both with and without a promoter.

FIG. 5 shows a graph of percent conversion as a function of time in the polymerization of the macrocyclic polyester oligomer cPBT for Formulations 10 and 11, using butyltin trioctanoate as catalyst, both with and without the diol promoter bis(4-hydroxybutyl)terephthalate. The graph shows that this linear oligomer of PBT is an effective promoter in accelerating the polymerization of MPO.

FIG. 6 shows a graph of weight average molecular weight of the polymer product as a function of time in the polymerization of cPBT for Formulations 10 and 11 in Experimental Examples 18 and 21, using butyltin trioctanoate as catalyst both with and without the promoter bis(4-hydroxybutyl)terephthalate.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A blend material stable at ambient temperature for at least one week, the blend material comprising:
   (a) a macrocyclic polyester oligomer; and
   (b) an organotin compound,
wherein the macrocyclic polyester oligomer comprises a structural repeat unit of the formula

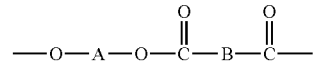

wherein A is an alkylene, or a cycloalkylene or a mono- or polyoxyalkylene group, and B is a divalent aromatic or alicyclic group.

2. The blend material of claim 1, further comprising:
   (c) a promoter, the promoter comprising an alcohol, an epoxide, or both.

3. The blend material of claim 2, wherein the promoter comprises at least one member selected from the group consisting of a mono-ol, a diol, a triol, and a higher polyol.

4. The blend material of claim 2, wherein the promoter comprises at least one member selected from the group consisting of a monoepoxide, a diepoxide, and a higher epoxide.

5. The blend material of claim 2, wherein the promoter comprises at least one member selected from the group consisting of butanol, decyl alcohol, octadecyl alcohol, ethylene glycol, propylene glycol, tetramethylene glycol, butanediol, 2-ethyl-1,3-hexanediol, polyethylene diol, polypropylene diol, polybutylene diol, poly(ethylene glycol), poly(propylene glycol), poly(tetramethylene glycol), and polyethylene mono-ol.

6. The blend material of claim 2, wherein the promoter comprises at least one member selected from the group consisting of bisphenol A diglycidyl ether and bis(4-hydroxybutyl)terephthalate.

7. The blend material of claim 2, wherein the promoter comprises a reaction product of a diol and a dialkyl terephthalate.

8. The blend material of claim 7, wherein the promoter comprises a reaction product of butanediol and dimethyl terephthalate.

9. A composition comprising:
   (a) the blend material of claim 2; and
   (b) a fibrous substrate.

10. The blend material of claim 1, wherein the organotin compound is present in an amount from about 0.01 to about 10 mole percent of the structural repeat units of the macrocyclic polyester oligomer.

11. The blend material of claim 1, wherein the organotin compound is present in an amount from about 0.01 to about 1.0 mole percent of the structural repeat units of the macrocyclic polyester oligomer.

12. The blend material of claim 1, wherein the organotin compound is present in an amount from about 1.0 to about 10 mole percent of the structural repeat units of the macrocyclic polyester oligomer.

13. The blend material of claim 1, wherein the organotin compound comprises at least one member selected from the group consisting of dibutyltin oxide, butyltin oxide hydroxide, butyltin trioctanoate and dibutyltin dilaurate.

14. The blend material of claim 1, wherein the organotin compound comprises at least one member selected from the group consisting of a dialkyltin oxide, a monoalkyltin hydroxide oxide, a monoalkyltin chloride dihydroxide, a dialkylchlorotin oxide, a monoalkyltin tricarboxylate, a dialkyltin dicarboxylate, and a bistrialkyltin oxide.

15. A composition comprising:
(a) the blend material of claim 1; and
(b) a fibrous substrate.

16. The blend material of claim 1, wherein the macrocyclic polyester oligomer comprises a macrocyclic copolyester oligomer.

17. The blend material of claim 1, wherein the macrocyclic polyester oligomer comprises at least one member selected from the group consisting of macrocyclic poly(1,4-butylene terephthalate)oligomer, macrocyclic poly(1,3-propylene terephthalate)oligomer, macrocyclic poly(1,4-cyclohexylenedimethylene terephthalate)oligomer, macrocyclic poly(ethylene terephthalate) oligomer, and macrocyclic poly(1,2-ethylene 2,6-naphthalenedicarboxylate)oligomer.

18. A method for increasing the rate of polymerization of a macrocyclic polyester oligomer, the method comprising the steps of:
(a) providing a mixture comprising a macrocyclic polyester oligomer and a catalyst; and
(b) contacting the mixture with a promoter, thereby increasing the rate of polymerization of the macrocyclic polyester oligomer.

19. The method of claim 18, wherein the contacting step triggers accelerated polymerization of the macrocyclic polyester oligomer.

20. The method of claim 18, wherein the catalyst comprises a compound having the formula

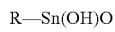

where R is an alkyl group.

21. The method of claim 18, wherein the catalyst comprises a compound having the formula

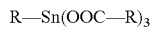

where each R group independently is, or two or more R groups taken together are, an alkyl group.

22. The method of claim 18, wherein the catalyst comprises a compound having the formula

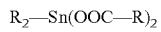

where each R group independently is, or two or more R groups taken together are, an alkyl group.

23. The method of claim 18, further comprising at least one of:
(c1) changing the concentration of the promoter;
(c2) changing the concentration of the catalyst; and
(c3) changing the temperature of the mixture, thereby controlling the rate of polymerization of the macrocyclic polyester oligomer.

24. The method of claim 18, wherein step (b) comprises contacting two separate streams in a reaction injection molding process, where one of the streams comprises the macrocyclic polyester oligomer and the catalyst, and the other stream comprises the promoter.

25. The method of claim 18, wherein step (b) comprises contacting the mixture with the promoter at a temperature from about 140° C. to about 260° C.

26. The method of claim 18, wherein the contacting step takes place in a process for in situ polymerization of the macrocyclic polyester oligomer.

27. The method of claim 26, wherein the process for in situ polymerization is a molding process, an extrusion process, a pultrusion process, or any combination thereof.

28. The method of claim 26, wherein the process for in situ polymerization is a rotational molding process, a compression molding process, an injection molding process, a resin transfer molding process, or any combination thereof.

29. A catalytic system for the polymerization of a macrocyclic polyester oligomer, the system comprising:
(a) a first component comprising an organotin compound; and
(b) a second component comprising an alcohol, an epoxide, or both, the catalytic system demonstrating increased catalytic activity in the polymerization of a macrocyclic polyester oligomer than a catalytic system comprising the first component or the second component alone.

30. A process for preparing a blend material, the process comprising the steps of:
(a) providing a macrocyclic polyester oligomer, wherein the macrocyclic polyester oligomer comprises a structural repeat unit of the formula

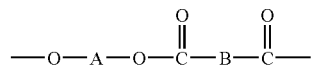

wherein A is an alkylene, or a cycloalkylene or a mono or polyoxyalkylene group, and B is a divalent aromatic or alicyclic group;
(b) contacting the macrocyclic polyester oligomer and an organotin compound to produce a blend material; and
(c) storing the blend material for at least one week.

31. The process of claim 30, further comprising the step of:
(d) heating the blend material at a temperature within a range from about 140° C. to about 260° C. to polymerize the macrocyclic polyester oligomer.

32. The process of claim 31, wherein step (d) comprises heating the blend material in the presence of fibers.

33. The process of claim 31, wherein step (d) comprises heating a fibrous substrate impregnated or coated with the blend material.

34. The process of claim 31, wherein step (d) is performed during resin transfer molding or compression molding.

35. The process of claim 30, wherein step (b) is conducted at a temperature within a range from about 70° C. to about 150° C.

36. The process of claim 30, wherein step (b) is conducted in an extruder, a blender, a pre-mold mixer, a mold, or any combination thereof.

37. The process for preparing a blend material, the process comprising the step of:
(a) providing a marcrocyclic polyester oligmer, wherein the macrocyclic polyester oligomer comprises a structural repeat unit of the formula

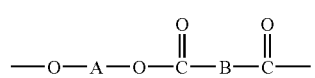

wherein A is an alkylene, or a cycloalkylene or a mono or polyoxyalkylene group, and B is a divalent aromatic or alicyclic group;

(b) contacting the macrocyclic polyester oligomer and an organotin compound to produce a blend material;

(c) storing the blend material for at least one week; and (d) contacting the blend material with a promoter to polymerize the macrocyclic polyester oligomer, the promoter comprising an alcohol, an epoxide, or both.

38. The process of claim 37, wherein step (d) is conducted at a temperature within a range from about 140° C. to about 260° C.

39. The process of claim 37, wherein the blend material is contained in a first stream and the promoter is contained in a second stream.

* * * * *

UNITED STATES PATENT AND TRADEMARK OFFICE
CERTIFICATE OF CORRECTION

| | | |
|---|---|---|
| PATENT NO. | : 7,256,241 B2 | Page 1 of 1 |
| APPLICATION NO. | : 11/329454 | |
| DATED | : August 14, 2007 | |
| INVENTOR(S) | : Takekoshi et al. | |

It is certified that error appears in the above-identified patent and that said Letters Patent is hereby corrected as shown below:

Col. 30, Line 29
Claim 30, line 29, insert --, a promoter,-- after the word "oligomer"

Col. 30, Line 53
Claim 37, replace the first word "The" with --A--

Signed and Sealed this

Twentieth Day of November, 2007

JON W. DUDAS
*Director of the United States Patent and Trademark Office*